(12) United States Patent
Banavar et al.

(10) Patent No.: US 6,425,016 B1
(45) Date of Patent: Jul. 23, 2002

(54) SYSTEM AND METHOD FOR PROVIDING COLLABORATIVE REPLICATED OBJECTS FOR SYNCHRONOUS DISTRIBUTED GROUPWARE APPLICATIONS

(75) Inventors: Guruduth Somasekhara Banavar, Yorktown Heights, NY (US); Kevan Lee Miller, Danbury, CT (US); Atul Prakash, Ann Arbor, MI (US); Robert Evan Strom, Ridgefield; Michael James Ward, New Haven, both of CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/863,782

(22) Filed: May 27, 1997

(51) Int. Cl.[7] .................................................. G06F 9/00
(52) U.S. Cl. ...................................... 709/310; 345/751
(58) Field of Search .................................. 709/315, 101, 709/107, 205, 310; 345/331, 332, 330, 329, 751; 707/8, 10; 717/4

(56) References Cited

U.S. PATENT DOCUMENTS

| | | | | |
|---|---|---|---|---|
| 5,019,961 A | * | 5/1991 | Addesso et al. | 364/192 |
| 5,133,075 A | * | 7/1992 | Risch | 395/800 |
| 5,220,657 A | * | 6/1993 | Bly et al. | 395/425 |
| 5,263,155 A | * | 11/1993 | Wang | 395/600 |
| 5,295,244 A | * | 3/1994 | Dev et al. | 395/161 |
| 5,392,400 A | * | 2/1995 | Berkowitz et al. | 395/200 |
| 5,892,949 A | * | 4/1999 | Noble | 395/704 |
| 5,893,125 A | * | 4/1999 | Shostak | 707/511 |
| 5,926,177 A | * | 7/1999 | Hatanaka et al. | 345/340 |
| 6,044,394 A | * | 3/2000 | Cadden et al. | 709/107 |

OTHER PUBLICATIONS

R. Strom, et al, "Concurrency Control and View Notification Algorithms for Collaborative Replicated Objects", IEEE, pp. 194–203.*

P. Muth, "Atomic Commitment for Integrated Databse Systems", IEEE, pp. 296–304.*

* cited by examiner

Primary Examiner—Alvin Oberley
Assistant Examiner—Sue Lao
(74) Attorney, Agent, or Firm—Gail H. Zarick; Anne Vachon Dougherty

(57) ABSTRACT

A system and method featuring a collection of model objects which hold data to be shared, and supporting interfaces to read and write the data, to create and destroy collaboration relationships and to attach "view objects" containing application code which will be automatically notified of value changes. Each user environment is provided with a model object control entity, referred to herein as a Collaboration Manager, which creates model objects, executes transactions, and creates association objects related to the collaboration. A concurrency control mechanism records the reads and updates of the data and of collaboration relationships within a single transaction site and guarantees that they are applied atomically and consistently to both the local and to all remote replica objects of the collaboration.

4 Claims, 16 Drawing Sheets

FIG.4A

| | | | | | |
|---|---|---|---|---|---|
| 303 → | REGISTERED COPIES = S3.026, S4.039 | | | | |
| 302 → | DESCRIPTION OF ASSOCIATION | | | | |
| 301 { $R_1$ | $R_1$ DESCRIPTION | OID 1 | REPLICA | DESC. | |
| | | OID 2 | REPLICA | DESC. | |
| 301 { $R_2$ | $R_2$ DESCRIPTION | OID 3 | REPLICA | DESC. | ← 301e |
| | | OID 4 | REPLICA | DESC. | |

| | | | | |
|---|---|---|---|---|
| 303 → 304 → | REGISTERED PRIMARY = S2.069 | | | |
| 302 → | DESCRIPTION OF ASSOCIATION | | | |
| $R_1$ | $R_1$ DESCRIPTION | OID 1 | REPLICA | DESC. |
| | | OID 2 | REPLICA | DESC. |
| $R_2$ | $R_2$ DESCRIPTION | OID 3 | REPLICA | DESC. |
| | | OID 4 | REPLICA | DESC. |

FIG.4C

| |
|---|
| 303 → UNREGISTERED |
| 304 → PRIMARY = S1.009 |
| 302 → DESCRIPTION OF ASSOCIATION |
| |

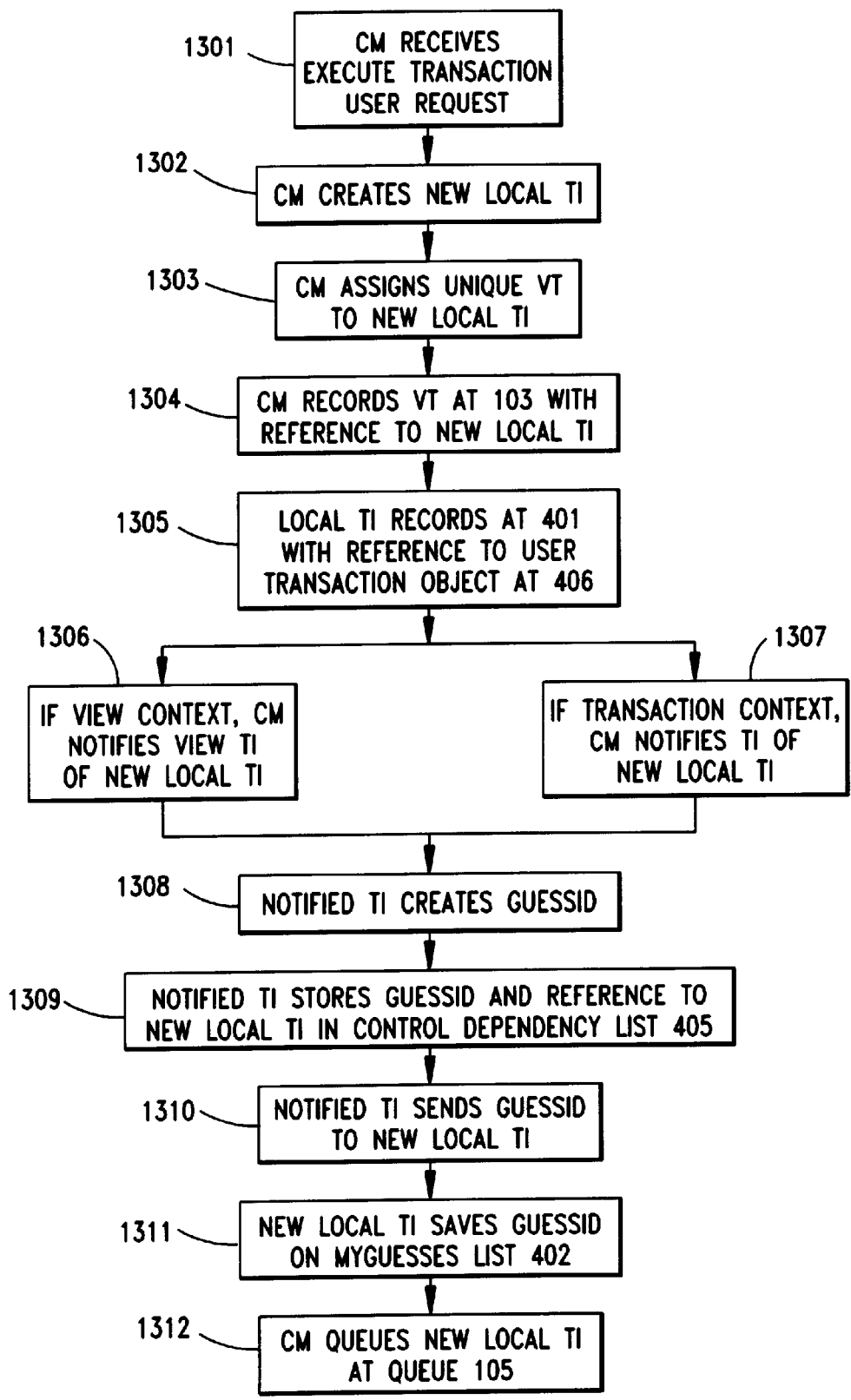

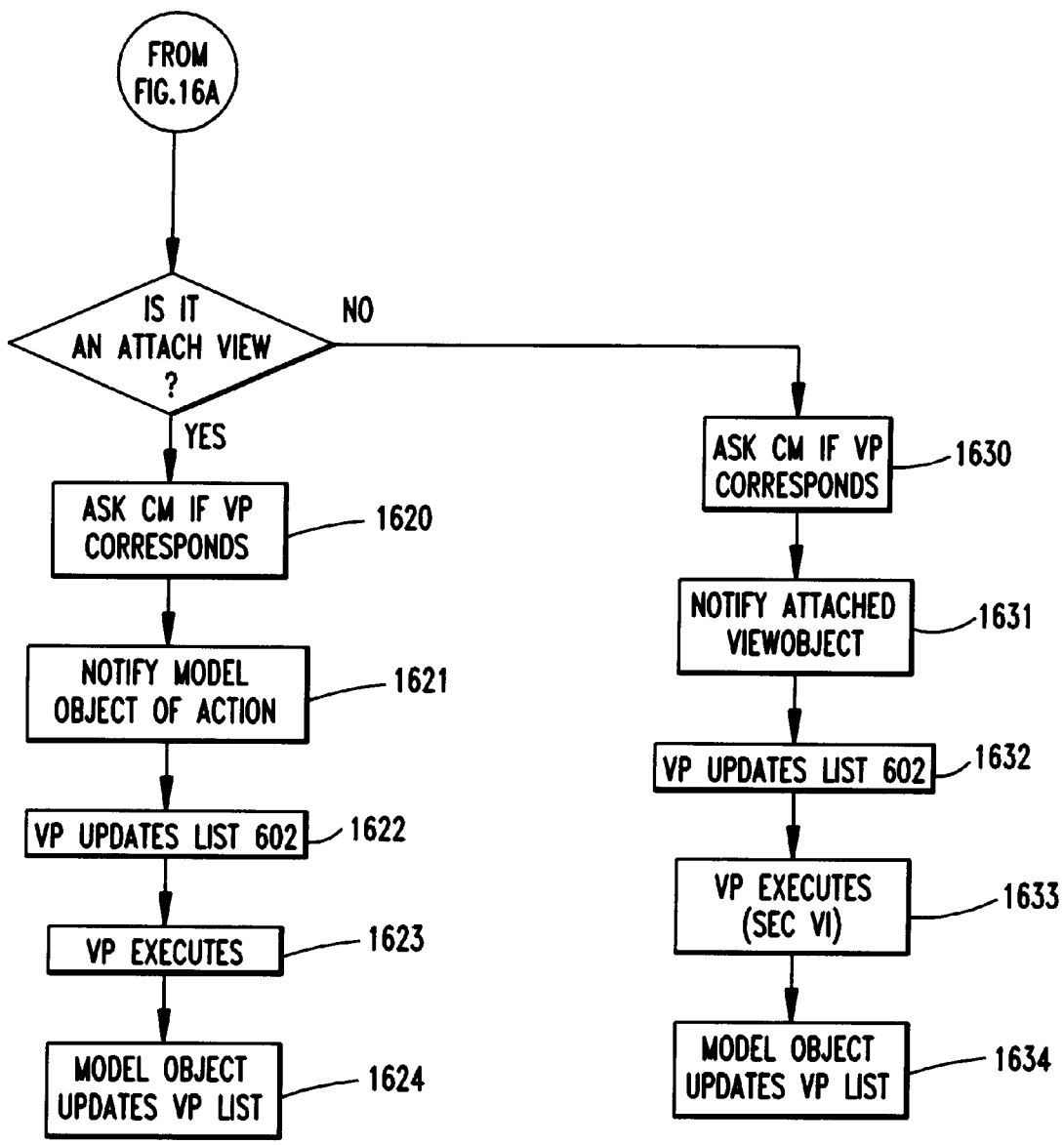

SYSTEM AND METHOD FOR PROVIDING COLLABORATIVE REPLICATED OBJECTS FOR SYNCHRONOUS DISTRIBUTED GROUPWARE APPLICATIONS

FIELD OF THE INVENTION

This invention relates to distributed groupware applications and more specifically to a system and method for providing, within an object-oriented programming environment, applications which can collaborate and synchronize data with other remote applications, and dynamically add, delete and track collaborations with remote applications.

BACKGROUND OF THE INVENTION

Synchronous distributed groupware applications have proliferated in the technology, particularly with the increased popularity of the World Wide Web. Loosely integrated groupware applications, such as chat boards, allow effectively simultaneous access at a single group "location," via browsers, to a host of remotely-located users. And with the addition of user programmability at the remote locations, the groupware applications can be extended to allow collaborative efforts which can range from collaborative input to a single version of a form to group navigation tools.

From the end user's perspective, the collaborative applications must be highly responsive, providing graphical user interface (GUI) responses at the initiating site as if only a single user were operating with the application, and providing updates at the remote sites with minimal response latency. In addition, the collaborative applications must provide awareness of ongoing collaborations and operations within the applications to all users.

Due to the wide variety of applications to be supported, it is desirable to provide a general application development framework. From the programming perspective, the development framework must be independent of the application and high level, capable of expressing a wide variety of collaborative applications. In addition, it is preferable that the developer not be required to be aware of distributed communication protocols, thread synchronization, contention, and other details of concurrent distributed programming.

Currently available object-based, GUI-oriented systems make use of the so-called Model View Controller (MVC) development scheme. Using MVC, applications can attach views to model objects, with controllers being used to update the state of the model objects. Typically, controllers receive input from GUI components and, in response, invoke operations to read or write the state of the model objects. The views are automatically notified when model objects are updated.

It is desirable to extend the MVC development scheme to development of collaborative applications having standard, generic model objects, with provision to the user of a responsive model object-based system capable of guaranteed atomicity on updates to model objects replicated at remote locations, and featuring dynamic establishment of collaborations between local model objects and those at remote applications.

SUMMARY OF THE INVENTION

The foregoing and other objectives are realized by the present invention which provides a system and method featuring a collection of model objects which hold data to be shared, and supporting interfaces to read and write the data, to create and destroy collaboration relationships between model objects and to attach "view objects" containing application code which will be automatically notified of value changes. Each user environment is provided with a model object control entity, referred to herein as a Collaboration Manager, which creates model objects, executes transactions, and creates association objects monitoring the state of the collaboration relationships. A concurrency control mechanism records the reads and updates of the data and of collaboration relationships within a single transaction site and guarantees that they are applied atomically and consistently to both the local and remote replica objects of the collaboration.

BRIEF DESCRIPTION OF THE DRAWINGS

The invention will now be described in greater detail with reference to the appended drawings wherein;

FIGS. 4A through 4C illustrate additional representative information which would be maintained at an association model object in accordance with the present invention.

FIGS. 13A and 13B provide representative process flows of activities conducted in response to a "CreateTransaction" user request, including the subsequent execution of a LocalTI (FIG. 13B).

DESCRIPTION OF THE PREFERRED EMBODIMENT

SECTION I

Glossary of Terms

Throughout the description, various terms will be used as well as the abbreviations for those terms. While the meaning of the terms will become apparent through the description, the following glossary (with brief explanation) is provided for easy reference:

OID-object identification, assigned to each model object in the inventive system, includes a SiteID of the site containing the designated model object and a unique identifier denoting the particular model object at that site;

user requests-method calls issued from view objects or transaction objects at the application layer to objects in the framework layer, including AttachView, DetachView, Read, Modify/Update, Replace, CreateInvitation, Register, Join, and Leave;

user notifications-method calls issued from objects in the framework layer to application layer objects;

VT-a virtual time stamp for tracking transactions occurring in accordance with the present invention, including $VT_r$ representing the virtual time for writing of a current value, and $VT_g$ representing the virtual time at which changes were made to the graph;

VP objects (View Proxy objects)-object created at the framework level in response to a user request to attach a view to a model object;

TI objects (Transaction Implementation objects)-objects created at the framework level per transaction (e.g., view notification, local or remote update, etc.) view object-a user-defined object which can be dynamically attached to one or more model objects;

optimistic view-one which receives an update notification as soon as possible after any of its attached model objects has changed;

pessimistic view-one which only receives update notifications when transactions updating attached model objects have committed such that the view will be able to see consistent values;

association object-an object whose state describes a set of collaborations which can be viewed to track which sites have joined collaborations;

invitation-an external string, such as a URL, created by the owner of an association and distributed to sites which may wish to join the association by collaborating with model objects therein;

replica relationship-a collection of model objects usually spanning multiple applications which have agreed to follow one anothers' values;

controller-an object which responds to end-user initiated actions, such as typing on a keyboard;

transaction-activity initiated by invoking an execute method on a transaction object;

guessid-an identifier of one of a set of conditions ("guesses") associated with a particular TI such that when all its guesses are confirmed, the transaction will commit, but if a single one of the guesses is denied, the transaction aborts.

SECTION II

Apparatus

Figure 1:
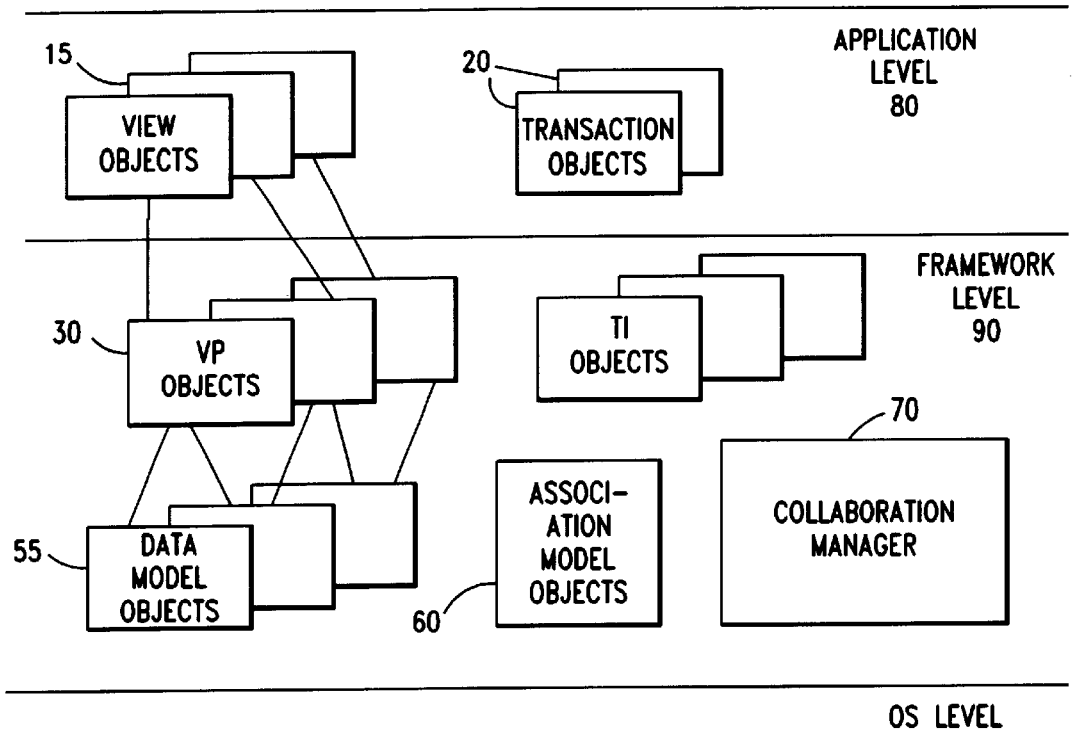
FIG. 1 provides a system overview which incorporates the present invention.

FIG. 1 illustrates a user location (site) comprising the application level 80, the framework level 90, and the operating system level 10. At the application level, view objects 15 and transaction objects 20 are provided for the user. View objects respond to notifications that data has changed locally. The purpose of a view object is to compute some function (e.g., a graphical rendering) of some or all of the model objects bound to it. When the local applications respond to events initiated by the end user at that site, transaction objects are created for reading and/or updating of data. The mechanism for interacting with the view objects and transaction objects in the application layer is the inventive Collaboration Manager 70, which is incorporated into the framework level of each local site.

The Collaboration Manager serves as an object factory, creating the other objects used by the system. It also serves as a message router, converting information in received messages into references to resident model objects and converting information in outgoing messages for transmission to model objects at remote locations and providing routing for those messages. The Collaboration Manager responds to requests to create new model object instances, to execute transactions, and to create association objects from invitations, as further detailed below.

The invention provides model objects, 50 and 60, at each user location for holding the application state. All model objects allow reading, updating, attaching of views, and joining and leaving of replica relationships. Two basic categories of model objects are provided by the inventive system, data model objects, including scalar (e.g., integer, string, etc.) and composite objects (e.g., tuples and lists) which respond to user requests specific to their data type (read, modify or replace), and association model objects, which are used to track replica relationships among remote collaborating sites and which respond to user requests to create an invitation for collaboration, or to register, join, or leave a collaboration. Both categories of model objects will additionally respond to Attachview and Detachview user requests, as further described below with reference to FIGS. 2 and 3.

The model objects, including both data 55 and association 60 model objects, are created by the Collaboration Manager 70 in response to user requests. Each such model object which is created is assigned an OID by the Collaboration Manager. The OID contains a SiteID and unique identifier for the particular model object at that site.

The framework level additionally comprises a set of View Proxy (VP) objects 30, each created by a model object in response to the first user request to attach a user view object to a model object. There is one VP object, 30, per user view object, 15, at the application level. VP objects are not visible to the users, as they do not directly support user requests. VP objects do, however, deliver user notifications to view objects by scheduling ViewTIs.

Finally, the framework level includes a set of Transaction Implementation (TI) objects 40. Each TI object may be a LocalTI (the details of which are discussed with reference to FIG. 5), a RemoteTI (the details of which are discussed with reference to FIG. 6), or a ViewTI (the details of which are discussed with reference to FIG. 7). Each TI object has a virtual time (VT), which represents a virtual time "stamp" for the represented transaction. At each site there is one LocalTI instance for each transaction initiated at that site. Whenever a message with a particular VT has been received at the site, there is one RemoteTI instance with that VT for the site. Finally, there is one ViewTI instance for each view notification which is scheduled.

Figure 2:
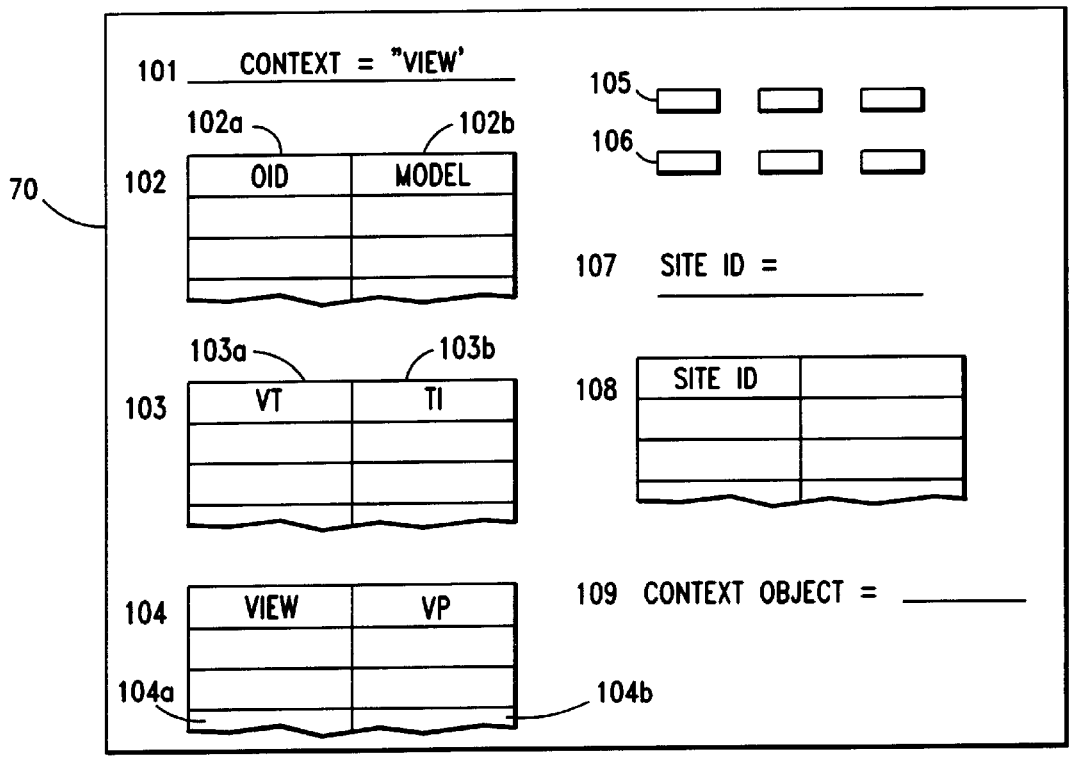
FIG. 2 provides a schematic representation of the Collaboration Manager and of some of the information maintained at the Collaboration Manager.

Each Collaboration Manager maintains the following information, as shown in FIG. 2: (1) the current context 101 in which user requests to model objects are being executed; (2) a table 102 mapping OIDs 102*a* of local model objects to model object references 102*b*; (3) a table 103 mapping VTs 103*a* to TIs 103*b*; (4) a table 104 associating each user view object 104*a* to a VP object 104*b*; (5) a work queue 105 of TI objects 40 which are to be scheduled; (6) a communication layer queue 106 of messages received from remote sites and not yet processed; (7) the SiteID 107 of the local site's Collaboration Manager; and (8) a table 108 mapping SiteIDs (including the SiteID portion of OIDs) to appropriate communication paths. The communication paths may use any of a number of well-known communications techniques, such as a CORBA object reference to the Collaboration Manager at the designated site.

The current context 102 which is maintained at the Collaboration Manager can be "transaction context" if the requesting object is a transaction, "view context" if the requesting object is a view, or "controller context." If transactions are executed in more than one thread, then the Collaboration Manager keeps a current context for each thread. Associated with the maintenance of the current context is a context object, 109. If the current context is transaction context, then the context object is a reference to the LocalTI object of the transaction being executed. If the current context is view context, then the context object is a reference to the VP object of the view being executed. Otherwise the context object is empty.

Figure 3:
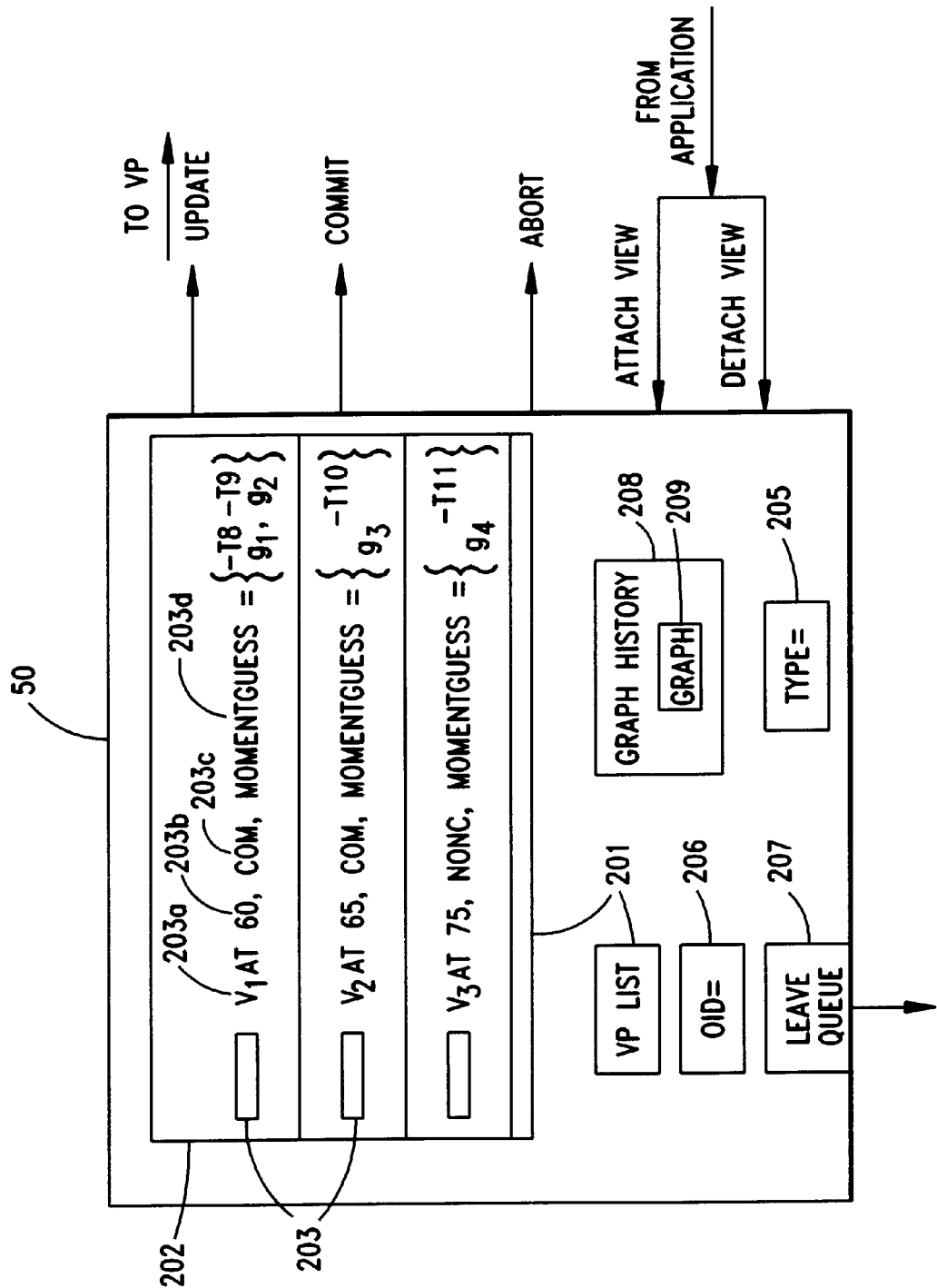
FIG. 3 schematically represents a Model Object, with state information maintained therein in accordance with the present invention.

Each model object 55 and 60, as represented in FIG. 3, keeps the following information: (1) the VP list 201 containing references to the view proxy objects of all attached views; (2) a history 202 consisting of a write moment 203 for each time the model object was updated, with each write moment containing a value 203*a* of the model object's data type, a virtual time 203*b*, an indication of whether the moment was committed or not at 203*c*, and a set of guesses 203*d*, comprising one guess identifying the TI for each instance during which an uncommitted value was read by a transaction; (3) a type 205 representing the type of model object; (4) the model object's OID 206; and (5) other information as may be required by the mechanism used for concurrency control.

Each association model object 60 additionally contains, as the value 203*a* of each of its write moments, a status as a primary association object created directly by the user, or as a non-primary association object which has been created by importing an invitation from a remote user. FIG. 4A provides a version of the information maintained at an association model object, with variations being provided at 4B and 4C.

For a primary association model object, the set of OIDs of the remote association objects which have registered with it are maintained at 303 of FIG. 4A; whereas, for non-primary association objects, location 303 contains only the OID of the primary association object. If the model object is registered, information which will be indicated, as shown in FIGS. 4A and 4B, includes the set of relationships 301 created in this association object; and, for each relationship, an ID, 301*a*, and the type and description of the relationship, 301*b*. Furthermore, for each joined model object, 301*c* provides the ID of the model object, 301*d* provides its role defining the relationship between the value of each model object and the value of others in the relationship, and 301*e* includes a description. The descriptive information, 302, about the association is provided for users who want to decide whether to register for collaboration with that model object. It is to be noted that primary association objects are, by default, registered and that registered, non-primary association objects always track the values of the corresponding primary object. If the status of the association object is non-primary, then the model object will additionally indicate whether it is registered or non-registered, at 304.

Figure 5:
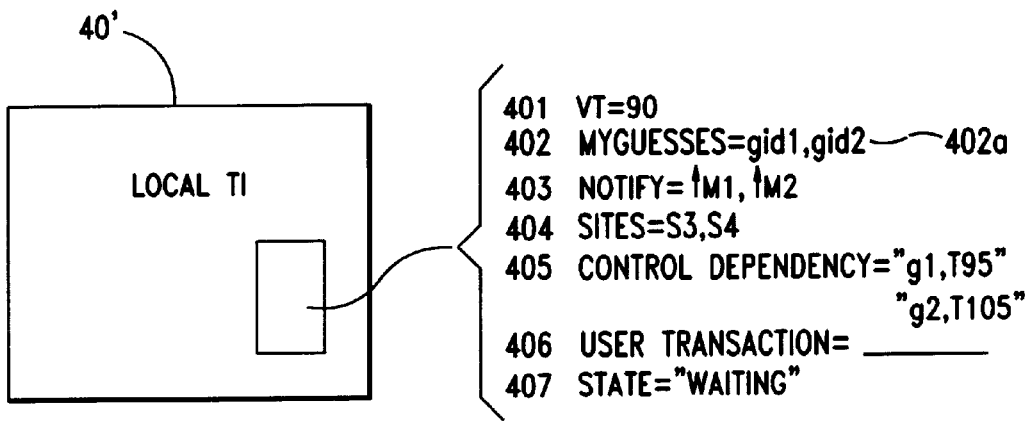
FIG. 5 provides a schematic representation of a LocalTI object and the information maintained therein.

FIG. 5 provides a schematic of a TI object 40' for a LocalTI. The LocalTI object will maintain the following information: (1) a global, unique virtual time (VT) 401, including the siteid of the initiating transaction which may be implemented in accordance with prior art techniques such as that proposed by Leslie Lamport (see: "Communications of the ACM", 21(7):551–565, July 1978); (2) a set of guess identifiers 402 called the MyGuesses list; (3) a set of sites 404 to which updates from the instant transaction have been sent; (4) a set of guesses called a ControlDependency list 405; (6) the reference 406 to the user transaction object 20 which is being executed; and (7) the state 407, comprising one of Committed, Aborted, or Waiting.

Figure 6:
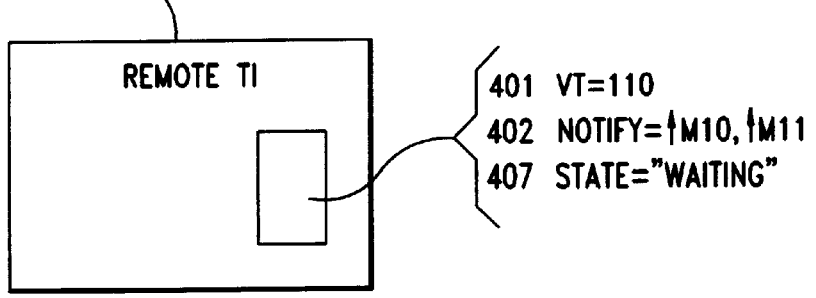
FIG. 6 provides a schematic representation of a RemoteTI object and the information maintained therein.

The Myguesses list of guess identifiers represents one guess identifier 402*a* for each guess object on the list. Each guessid represents an assumption, which will either be confirmed or denied later on, that the given TI will commit. The object which registers the guess retains the guess identifier and a reference to the LocalTI as a pair of values. Each guess that is on the MyGuesses list is additionally registered with the LocalTI of the transaction which is guessing that the given TI will commit. Each RemoteTI object, 40", includes a VT 401, a Notify list 402 and the state 407, as shown in FIG. 6. The ViewTI, shown in FIG. 7, also maintains its VT 401, a MyGuesses list 402, ControlDependency list 405, and the state 407.

Figure 8:
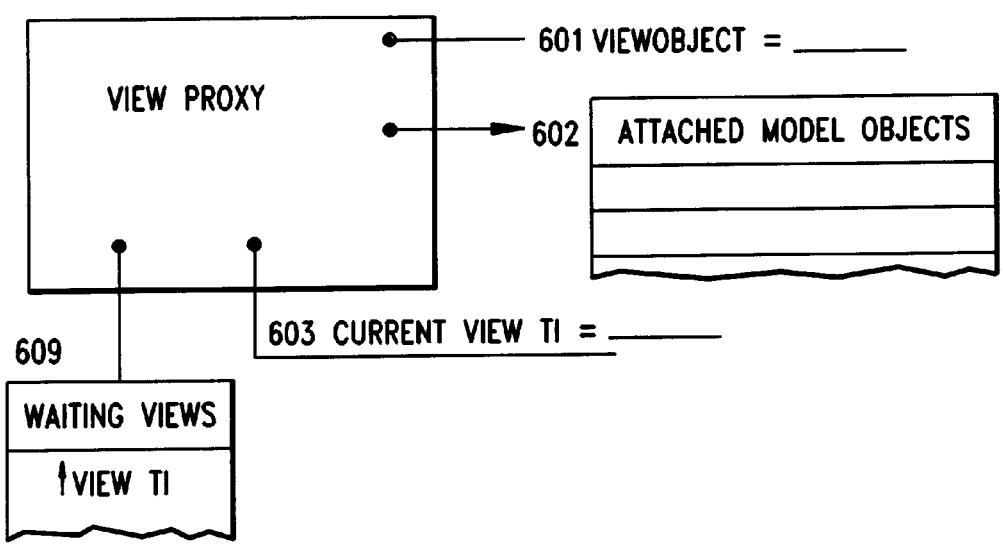
FIG. 8 provides a schematic representation of a View Proxy object and the information maintained therein.

The ViewProxy (VP) object, shown schematically in FIG. 8, contains (1) a reference 601 to the view object which is to be notified; (2) a set of references to the model objects attached to the VP; and (3) a reference 603 to the current ViewTI.

Figure 11:
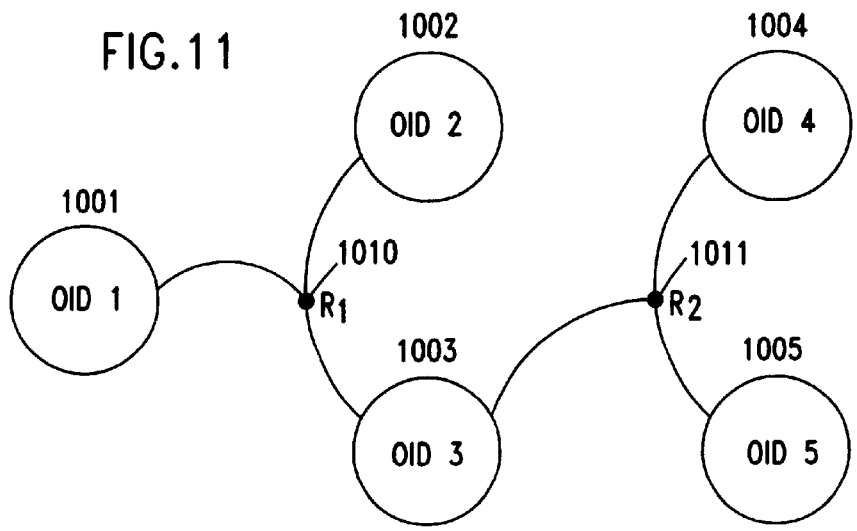
FIG. 11 illustrates a transitive graph of the type maintained within a model object, the graph showing OIDs of locations in a replicated system in accordance with the present invention.

FIG. 11 depicts a transitive graph (hereinafter referred to simply as a "graph"), one of which would be associated with and maintained at each model object of the present invention, in the graph location 209 of the graph history section 208 as depicted in FIG. 3. Each graph has a node 1001 which corresponds to the model object itself and its OID. The graph additionally includes each node, 1002–1005, which is reachable by node 1001, either directly or indirectly, through collaboration relationships. The graph has a multi-edge set for each collaboration relationship joined by the nodes in the graph, 1010 and 1011. For the situation where each collaboration relationship is a replication relationship, the set of nodes in the graph is precisely the replica set of the given model object. Each model object additionally maintains a history 208 of their graph 209, labelled with each VT moment at which the graph has changed due to locations joining and/or leaving the collaborative relationship with the model object. The graph may additionally include information as to which is the primary copy of the replicated information.

All sites are provided with a shared function for mapping transitive graphs to a selected node in that graph designated as the primary copy. The site of the primary copy is referred to as the primary site. The identity of the primary copy will change as the graph changes due to individual model objects joining and leaving the collaboration, as noted above. Any model object can potentially be the primary copy at some time. When a model object serves as the primary copy, its history is augmented with a reservation list, shown in FIGS. 12A and 12B, comprising a monotonically growing collection 1102 of reservations, each of which is an open interval (VT1,VT2) denoting the fact that no changes to the value of the model object, or to any of the replica model objects in the replica set, will be permitted at times greater than VT1 or less than VT2, to insure consistency of order at all sites. Each model object in the relationship has instance variables for recording $VT_g$ and $VT_r$ during a particular transaction, (detailed below) to insure that the VT values set by the primary copy will be respected.

The concurrency control system is predicated on the fact that the results of executing reads and updates at all sites must be the same as if they had executed in VT order at the primary site. Whenever the originating site of the transaction is not the primary site of some of the objects read or written by a transaction, the transaction executes optimistically, with update notifications to all related entities. The transaction "guesses" that the reads and updates performed at the originating site (e.g., 1001 of FIG. 11) will execute the same way when re-executed at the primary site (e.g., 1004). If these guesses are confirmed, the transaction is able to commit.

SECTION III
Method of Operation for Collaboration Manager

The remainder of the ensuing description will involve the operations of the present inventive system, the apparatus of which has been the subject of the preceding portion of the description and which will be referred to throughout. As will be understood by one having skill in the relevant art, the process flow charts are representatively created to elucidate the description, and should not be interpreted as providing the necessary order of operations for a parallel processing environment.

The Collaboration Manager 70 will respond to the user requests in accordance with the following descriptions.

Create Model Object

A user request to create a model object will specify the model object type (e.g., integer, string, association) and, in response, the Collaboration Manager will create a new instance of one of the model implementations, 55 or 60, and will create a new OID and insert into its table 102 this OID along with a reference to the model object. The OID shall include the SiteID associated with the Collaboration Manager. If the model object is an association object, the new association object 60 is initialized to be a primary association object with an empty set of relationships, 301 of FIG. 4A, and an empty set of copies, 303 of FIG. 4A.

Create From Invitation

In a request to the Collaboration Manager to create an association object from an invitation, the invitation will contain an encoding of the OID of the primary association object at another site. The encoding can be done by any one of a number of encoding techniques which have been used in the past to externalize remote object references (e.g., CORBA). The Collaboration Manager responds to the invitation by creating an association model object, together with an OID as above. The primary site OID is referred to in the newly created, but as yet unregistered, association object and is stored in location 303.

Create Transaction

Figure 13B:
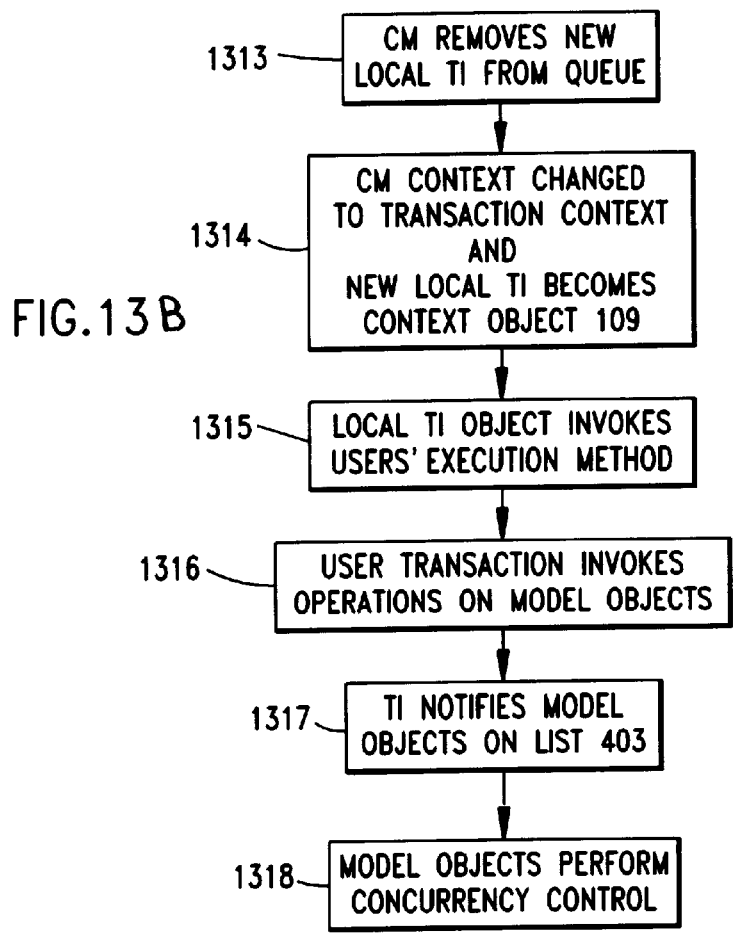
Figure 14:
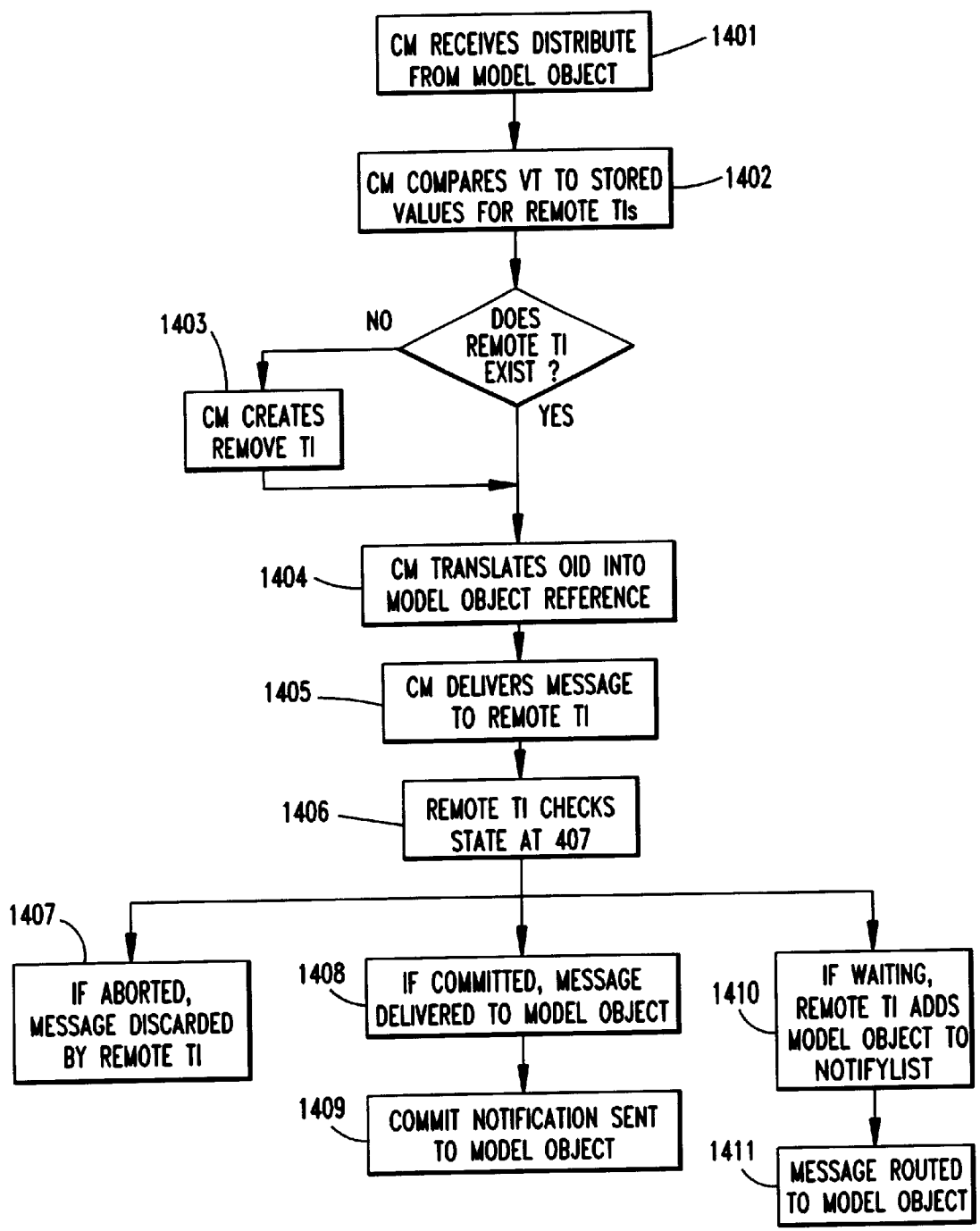
FIG. 14 provides a representative process flow of the activities conducted in response to a request for distribution of updates from remote sites.

In a "create transaction" request, as represented by the process flow of FIG. 13, the Collaboration Manager is provided with a reference to a user transaction object 20 at the application level at 1301. The Collaboration Manager creates a new LocalTI 40' at 1302 and assigns to it a unique VT, at 1303. The assignment of the VT is recorded in table 103, including the VT at 103a and a reference to the LocalTI at 103b, in step 1304. The LocalTI is given its VT, for storing at location 401 shown in FIG. 5, and a reference to the user transaction object which is being executed, which is stored at 406, both steps of which are shown at 1305.

If the current context 101 is view context or transaction context, then the transaction is a dependent transaction. If the current context is view context, the context object 109 is a VP. The VP's ViewTI, is notified of the new LocalTI at 1306. If the current context 101 is transaction context, the context object 109 will be a TI, which is notified of the new LocalTI at 1307. In response to such notification, the notified object (either ViewTI or LocalTI) will create a guessid and will retain the guessid and a reference to the new LocalTI on its ControlDependency list 405, as shown at steps 1308 and 1309. The guessid is then returned to the new LocalTI object at 1310, which completes its initialization by saving the guessid on its MyGuesses list 402, at step 1311. This operation records the fact that the new LocalTI will commit only if the originating transaction (i.e., the LocalTI or the ViewTI) commits. After the new LocalTI is initialized, it is then queued for execution at queue 105, in a "Waiting" state by the Collaboration Manager at 1312. The Collaboration Manager will schedule TIs from its work queue 105 whenever the queue is non-empty.

When the TI being scheduled is a LocalTI, the following is done: the Collaboration Manager removes the LocalTI from its queue 105 at step 1313; the context 101 is changed to transaction context at step 1314; and the TI being scheduled becomes the context object 109. The TI object then invokes an execute method of the user transaction object denoted as its user transaction reference 406 at step 1316, including one or more of the operations detailed in Section IV below. The user transaction, in response, invokes operations on the model objects. The exact behavior of each operation will depend upon the data type of the model object, with local computation being the same as the local computation performed by a conventional non-collaborative object.

After all of the operations of a transaction have been performed (i.e., the execute method has been completed), the TI notifies all model objects on its notify list 403 that the operation has executed at 1317. Each model object then executes a concurrency control and distribution protocol, step 1318, as further detailed below in Section V. Each updated model object, in turn, notifies any attached VP objects on its VP list 201 of the update and the VP objects perform a view notification protocol as detailed in Section VI below.

Messages

The Collaboration Manager at each site receives messages resulting from execution of various protocols at other sites. These messages will always include a header including either a Request or Response message plus a given OID, a Distribute message together with a VT and an OID, or a VT alone. The messages are queued in the message queue 106 so that they can be executed serially with transactions. When the message is a Request or a Response of a protocol initiated at a model object (as detailed in Section V below), the Collaboration Manager simply routes the message to the appropriate model object, as determined from the OID, by referring to table 102.

Distribution of Updates From Remote Sites

When the message is a Distribute message to a particular model object, the Collaboration Manager examines the VT at 1402. If no RemoteTI exists in table 103 for the VT, a RemoteTI is created in the Waiting state with an empty Notify list, and an association between that VT and the new RemoteTI is added to table 103, at step 1403. The RemoteTI, whether newly-created or pre-existing, is given the message at 1405, with the OID translated into a model object reference according to table 102 from 1404. The RemoteTI then checks its state 407 in step 1406. If it is Aborted, the message is discarded at 1407. If the state is Committed, the message is delivered to the model object at 1408 and a commit notification is sent to that model object at 1409. Finally, if the state is Waiting, the RemoteTI appends the reference to the model object on the Notify list 403, at step 1410, and the message is routed to the model object at 1411. The model object responds by updating its history 202 at step 1412 and issuing a NotifyUpdate to each VP on its list 201 at step 1413.

Transaction Control Messages From Remote Sites

In the instance when the message contains simply a VT, the Collaboration Manager examines the table 103 of RemoteTIs' and routes the message to the RemoteTI which corresponds to the VT. If no RemoteTI exists, one is created having a Waiting state and an empty Notifylist as at 1403 above. Each RemoteTI responds to a Commit message by changing its state 407 to "Committed" (see, 1514 of FIG. 15) and then sending a Commit notification to each object on list 403 at 1515 of FIG. 15, after which the list is discarded, at 1516. In response to an Abort message, the RemoteTI state is changed to "Aborted," an Abort notification is sent to each object on list 403, and the list is discarded.

Figure 15A:
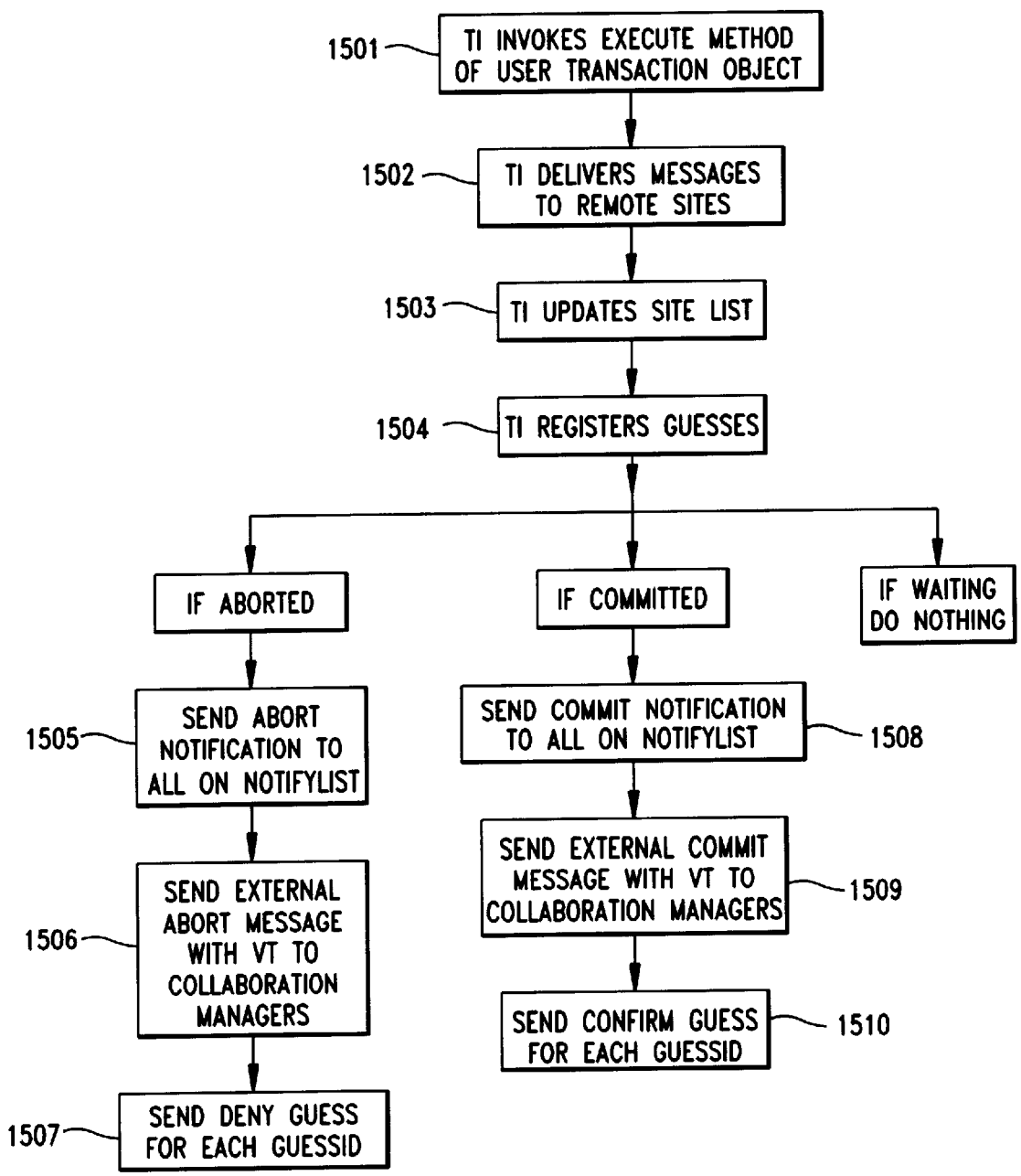
FIGS. 15A and 15B provide representative process flows of activities conducted in response to a user transaction at a LocalTI.
Figure 15B:
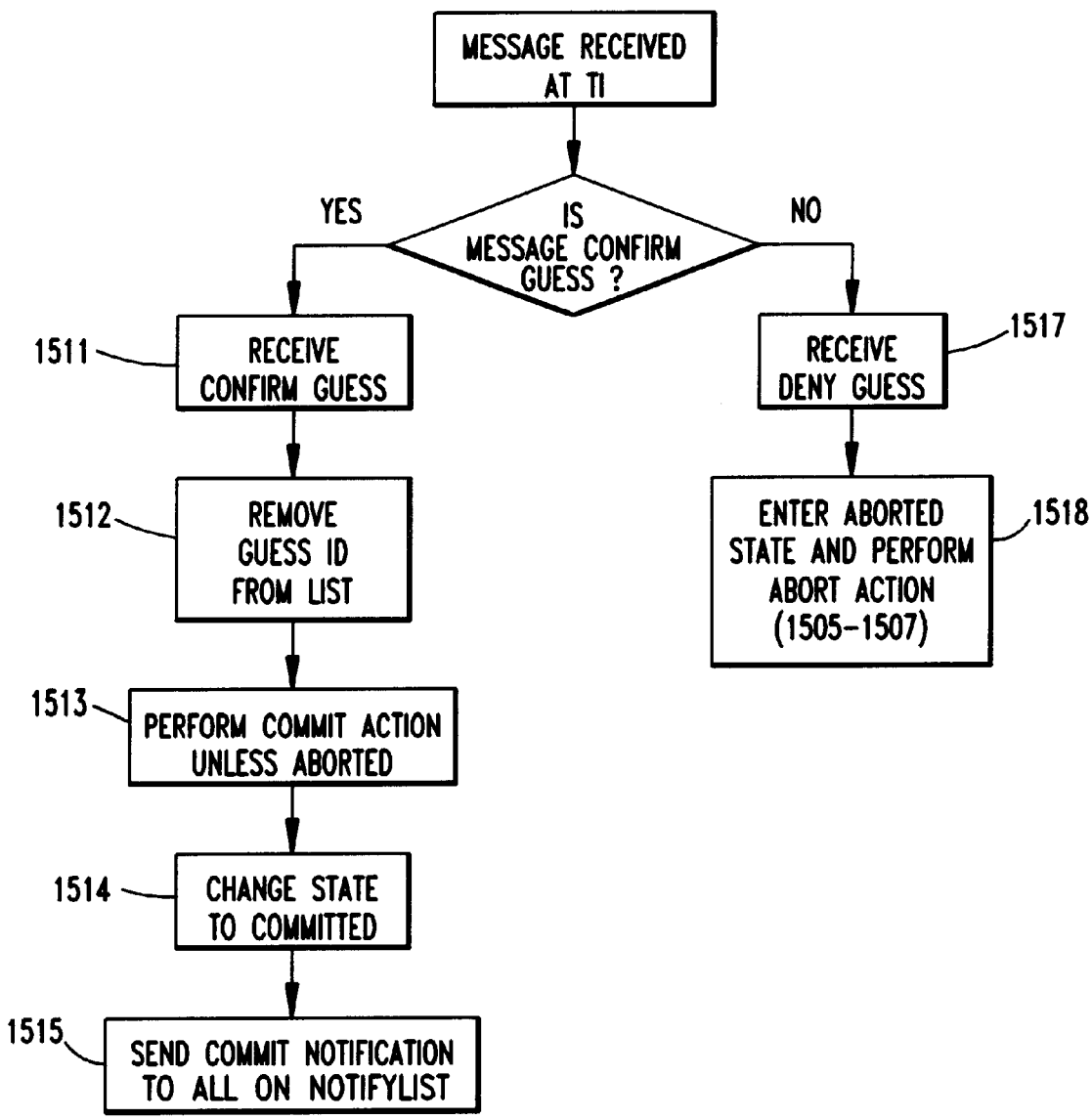

SECTION IV
Method of Operation for LocalTI (FIG. 15)

As discussed above, the TI object invokes the execute method of the user transaction object with which it is associated. The execute method may read, write, and update model objects within the application. Any changes to model objects will be propagated to their replicas. In addition to performing the execute function, one or more of the following will be performed: (1) delivering or distributing messages to remote sites, which messages will contain the VT of the transaction and the OIDs of the remote model objects to which data is being distributed and/or concurrency control messages are being sent, at step 1502; (2) updating of the Site list 404, which tracks the sites to which all distributed messages from this transaction have been sent at 1503; and, (3) registering of guesses in the MyGuesses list 402 of the TI at 1504. After processing the transaction, the TI will be in one of three states, recorded at 407, Aborted, Committed, or Waiting.

If the state is Aborted, because the concurrency control protocol aborted the transaction, the LocalTI performs an Abort action (1505–1507) comprising the steps of (1) sending an Abort notification to all of the model objects on the Notify list 403; (2) sending an external Abort message containing the VT to all Collaboration Managers at sites on the Site list 404; and, (3) sending a DenyGuess for each guessid to the corresponding TI object on its ControlDependency list 405. The TI is then rescheduled for execution on the queue 105 and the transaction retried when the Collaboration Manager finds it at the top of the queue.

If the state is Committed, because the transaction was not aborted and there are no guesses on the MyGuesses list, a Commit action (1508–1510) is performed by the LocalTI. In performing a Commit action, the LocalTI does the following: (1) sends a Commit notification to all model objects on the Notify list 403; (2) sends an external Commit message containing the VT to all Collaboration Managers at sites on the Site list 404; and (3) sends a ConfirmGuess message for each guessid to the corresponding TI object on its ControlDependency list 405.

Finally, if the state is Waiting, because the transaction has not been aborted, but there are guesses on the MyGuesses list which have not yet been confirmed or denied, the concurrency control protocol guarantees that a future event will occur which will either send a ConfirmGuess or a DenyGuess method call to the TI. Upon receiving a ConfirmGuess method call at 1511, the TI removes the designated guessid from the MyGuesses list 402 at 1512. If this results in the condition that the MyGuesses list is now empty, then the TI performs a Commit action (1513–1516), unless the TI is in the Aborted state. Upon receiving a DenyGuess method call at 1517, the TI enters the Aborted state at 1508 and performs an Abort action at 1505–1507.

Figure 16A:
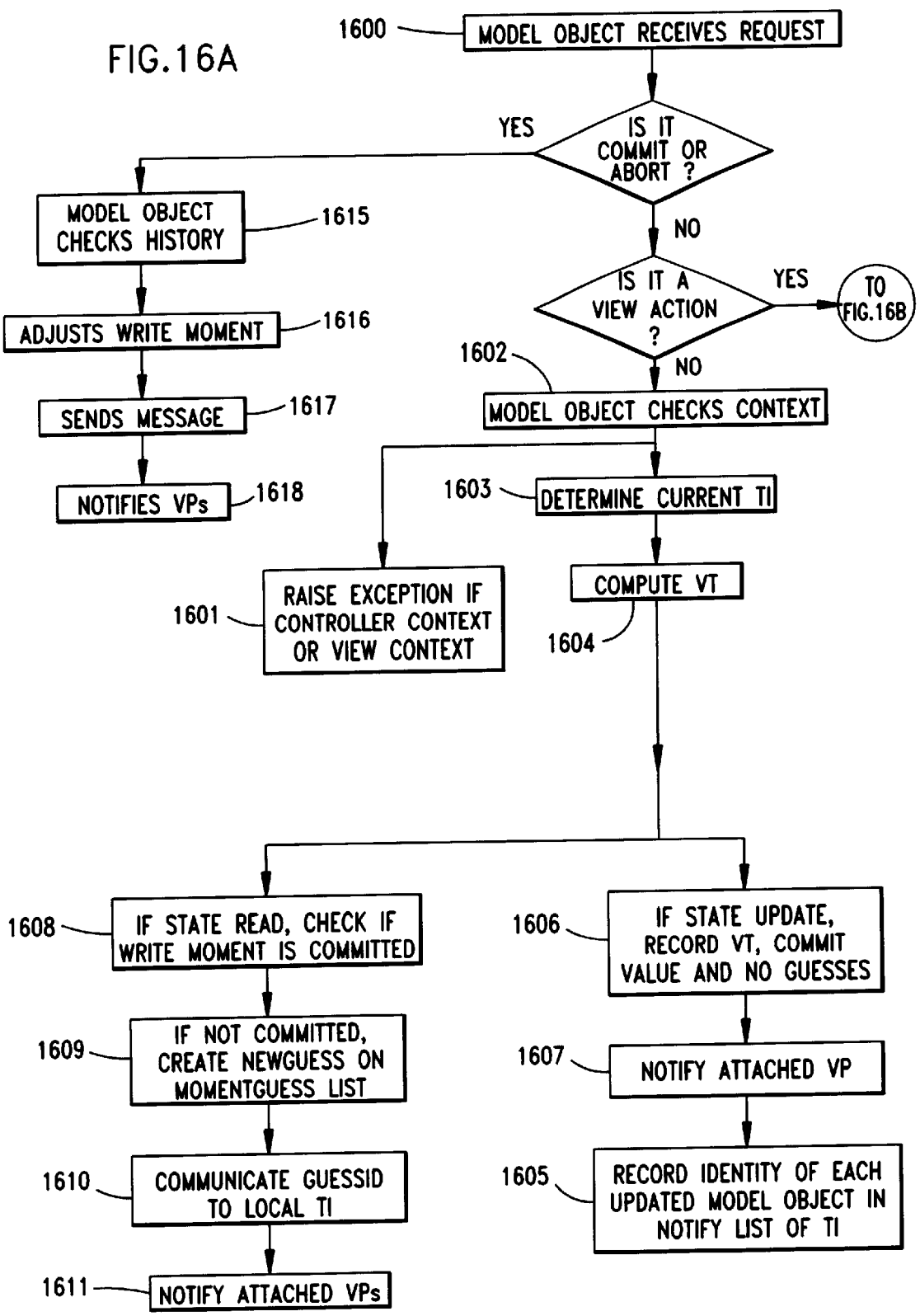
FIG. 16 illustrates a representative process flow of the activities performed in response to a request received at the model object.

SECTION V
Method of Operation for Model Objects (FIG. 16)

Model objects respond to requests for reading, updating and attaching of views, and for creating invitations, registering, joining and leaving collaborations, all of which are detailed in this Section.

Read or Modify

When a model object receives a user request to read or modify its value (determined at 162), the model object executes that request and performs additional actions, as follows. The model object checks the context 101 at 1601, due to the fact that state-changing operations must only be performed from transaction context. For operations arising out of a view context, an exception is raised at 1601 with an error signalled to the user. From controller context, either an exception is raised at 1601 or an implicit transaction is created and scheduled. In addition, the current TI is determined at 1603 from the context object 109, either as a LocalTI if in the transaction context or from the VP's current view TI, 603, if in the view context. The virtual time is computed from the current TI's virtual time 401 at step 1604.

The model object additionally records the identity at 1605 of each updated model object in the Notify list 403 of the current TI. In one implementation of the invention all reads may be recorded as well. Any state update is recorded in the history 202 at step 1606, together with the VT of the transaction by creating a new write moment 203 with the value at location 203*a*, the VT at 203*b*, "uncommitted" at location 203*c*, and an empty Momentguess list at 203*d*. Any read of the state of the object is performed as of the VT of the current context, such that the value which is read is the latest value of a write moment 203 whose VT, at 203*b*, is earlier than the current TI's VT. If the write moment, at 203*c*, associated with the state read is currently not committed, as determined at 1608, than a new guess is created on the MomentGuess list 204 in step 1609, and the id of that guess is communicated to the LocalTI, at step 1610, which places that guess on it MyGuesses list 402. Finally, attached VPs on the list 201 are notified of the updated value with the method NotifyUpdate at 1611 and 1607. Further view notification is performed in accordance with the description found in Section VI.

Commit

When a commit notification is received at a model object, as determined at 160, the model object performs the following: (1) if the history of the model object contains a write moment 203 with that VT, that write moment is changed at 1616 to the committed state as shown at 203*c*, and for each guess in the MomentGuess list 204 of that write moment, a ConfirmGuess message is sent at 1617 to the TI corresponding to that guess; and, (2) if the model object has any attached view proxy objects on its list 201, those VP objects are notified at 1618 of the commit, which triggers the view notification protocol found in Section VI.

Abort

When an Abort notification is received at the model object, as determined at 161, the model object does the following: (1) checks the history as above at 1615; if the history of the model object contains a write moment 203 with that VT, the write moment is altered by deletion at 1616, and for each guess on the MomentGuess list 204 associated with that write moment, a DenyGuess is sent at 1617 to the TI associated with the guess; and (2) if the model object has any attached VP objects on its list 201, those VP objects are notified at 1619 of the Abort which, again, triggers the view notification protocol.

Attachview

In response to a user AttachView request, as determined at 163, the model object interrogates the Collaboration Manager 70 at 1620 to determine whether a VP already exists for the specified view object. The Collaboration Manager makes this determination by performing a lookup at table 104. If a VP already exists, the model object notifies the VP at 1621 that the model object is being attached. The VP updates its list 602 of attached model objects at 1622, and performs an AttachView operation at 1623 to invoke the view notification protocols of Section VI. The model object updates its VP list 201 by adding a reference to the VP at 1624.

If a VP does not exist, a VP is created and given a reference 601 to the user view, with the particular implementation of VP being selected based upon the view notification mechanism, below. The Collaboration manager updates it table 104 by appending a mapping between the user view object 104a and the new VP object 104b.

Detachview

In response to a DetachView user request, as determined at 163, the model object requests at 1630 that the Collaboration Manager perform a lookup of its table 104 to ascertain which VP object corresponds to the detached user view object. The model object then notifies, at 1631, the attached view object that the model object is being detached. The VP updates its list 602 by removing the detached model object reference at 1632, and invokes the DetachView operation at 1633 resulting in execution of the view notification protocol in accordance with Section VI. The model object updates its VP list 201 by removing the reference to the VP, at 1634.

Association Model Object Responses

Figure 17:
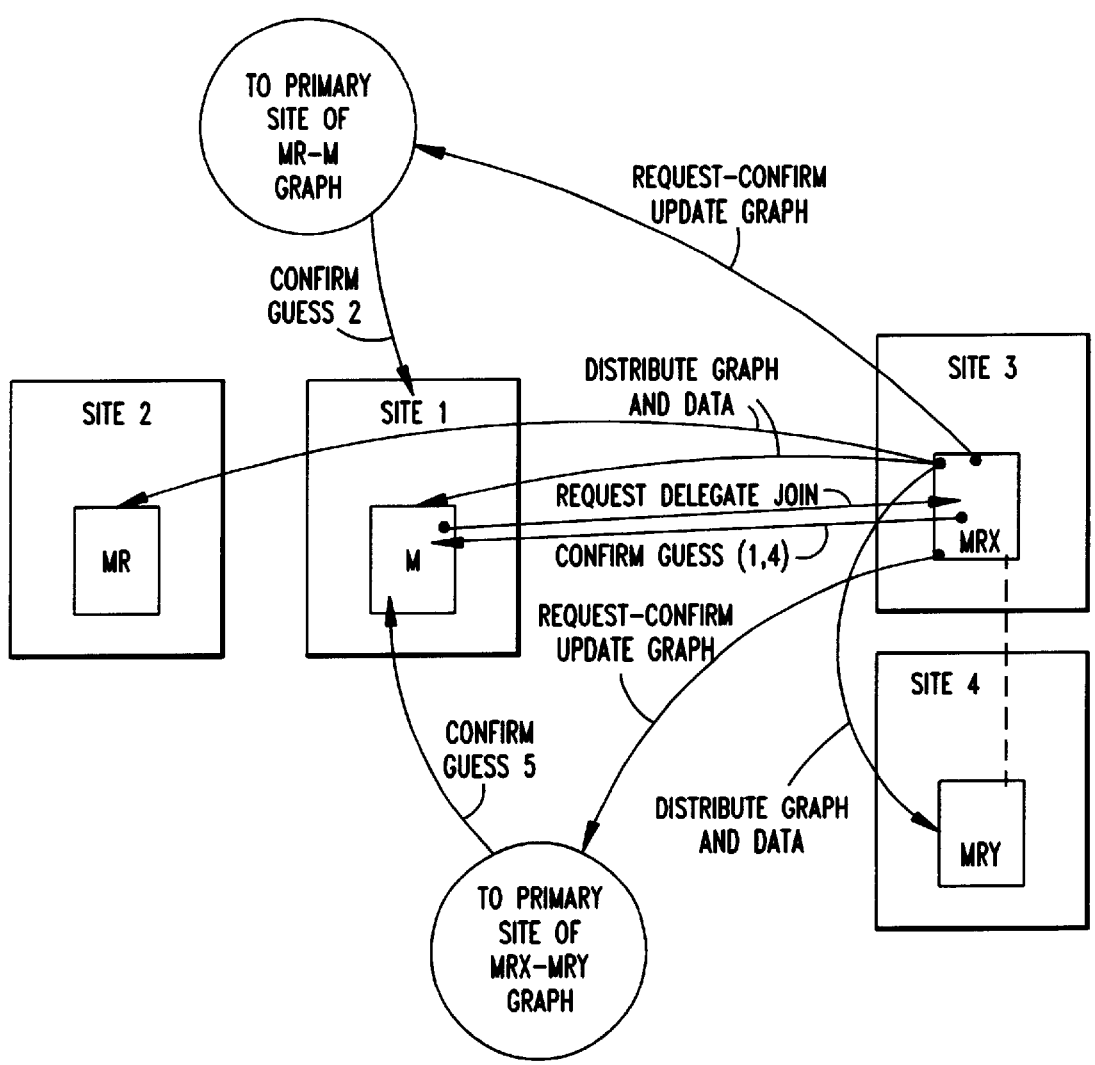
FIG. 17 illustrates the communications involved in a join protocol in accordance with the present invention.
Figure 18:
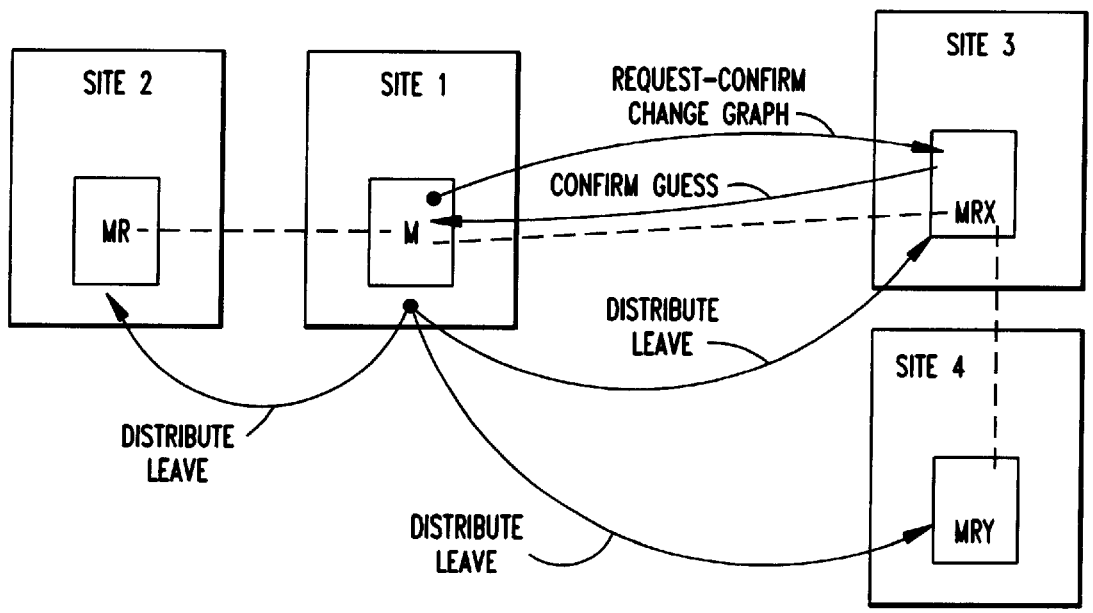
FIG. 18 illustrates the communications involved in a leave protocol in accordance with the present invention.

Association model objects additionally respond to the user requests CreateInvitation, Register, Join and Leave requests. (FIG. 17) FIGS. 17 and 18 provide a depiction of sites which may wish to invite other sites into collaboration, join, or leave collaborative relationships, and register with collaborating sites. Assume for FIG. 17 that Site 1 is seeking to join a relationship which already exists between Sites 3 and 4. Sites 3 and 4 contain replicas MRX and MRY, respectively. Site 1 holds M, which is replicated at Site 2 as MR. The representative communications among the entities are illustrated along the arrows. FIG. 18 similarly illustrates the messages sent for the leave protocol. As the ensuing description details, the other protocols will parallel the illustrated Join and Leave protocols.

Create Invitation

In response to a user CreateInvitation request, if the association model object is a primary association object (see FIG. 4A), then an invitation is created which refers to the OID of the given association model object. The invitation is an external object reference which can be created using any of a number of well-known distributed object implementations, such as the aforementioned CORBA. The only requirement is that the reference be one which can be interpreted by the operation "CreateAssocationFromInvitation". If the association model object is not a primary association object, then the invitation is created referring to the OID of the primary association object saved in slot 304.

Register

In response to a Register user request, a primary association model object needn't perform any functions, since it is already registered. If the association model object is not primary and it is not registered, then it invokes a Register protocol to assure that (a) when the transaction containing the Register operation commits, the value of the association model object is a copy of the component 302 and 301 (FIGS. 4A–4C) of the value of the primary association object, and that (b) the association model object continues to follow changes to the value of the primary association object. The Register protocol for a non-primary, non-registered includes the following steps: (1) a Request-Register message is sent to the primary association object specifying all the information from the user request and the OID; (2) at the primary association object, the requesting OID from the Request-Register message is added to the RegistrationList 303; (3) the primary association object returns a Reply-Register message to the requesting model object as determined from the OID, with the message containing the value of the primary association object including its set of relationships and joined objects.

Join (FIG. 17)

For a Join user request, the request usually specifies a model object, an optional relationship name within the association, and a role within the relationship such as "replica" or such other role which has been defined for implementation of the mechanism. If the relationship name is omitted, a new relationship is created containing the single model object. The association object invokes a Join/Leave awareness protocol, below, to update the primary association objects and all other association objects registered with that primary association object to provide awareness that the designated model object has joined the particular relationship, by updating state information 301. The association object additionally invokes a specific Join protocol to actively notify all model objects in the relationship of the fact that the designated model object has joined the relationship, and, where necessary, to update the values of the model objects and their graphs to reflect the change in relationship.

Leave (FIG. 18)

In response to a Leave user request which specifies a model object, a relationship within the association object, and a role previously joined by the model object, the association model object invokes the Join/Leave awareness protocol, outlined below, to update the primary association object and all other association objects registered with that primary association object to provide awareness that the designated model object has left the relationship, by updating state 301. The association object additionally invokes a specific Leave protocol to actively notify all model objects in the relationship of the fact that the requesting model object has left the relationship and to update their graphs.

The Join/Leave Awareness Protocol

The Join/Leave awareness protocol provides that, when a join or a leave request is made at an originating site, the originating site, if it is also the site of the primary association object, immediately updates the association object and distributes the change to the data via a Distribute message to each other registered association object, as determined by the OIDs in list 303 of FIG. 4A.

If, however, the originating site is not the site of the primary association object, the originating association object updates its value, registers a guess with the LocalTI, saving the guessid in a slot associated with the write moment $VT_n$, and sends a Request-Join or a Request-Leave request to the primary association object, specifying its own OID, the time VT, the time of the most recent previous graph write moment $VT_g$, and the request parameters. The primary association responds to this message by checking that no intervening write moment occurred between the time $VT_n$ and the $VT_g$, reserving that interval so that subsequent attempts to update that association object will abort. The primary association object also checks that VT itself does not lie in any previously reserved interval. If all of the foregoing checks succeed, then the primary object updates the association data, distributes it to all registered association objects, except for the requesting object, via a Distribute message, and sends a Response-Confirmed message to the requesting association object. If a check fails, the primary sends a Response-Denied message to the requesting association object.

When the requesting association object receives a Request-confirmed message, it retrieves the guessid from the slot associated with write moment VT and sends a guess confirmed confirmation notice to the LocalTI. In the alternative, if a Response-Denied message is received at the requesting object, it retrieves the guessid and sends a guess deny notification to the LocalTI.

In addition to executing the Join/Leave awareness protocol, as mentioned above, the primary association site will perform a specific Join protocol in response to the Join user request or a specific Leave protocol in response to the Leave user request, each of which will now be detailed.

Specific Join Protocol (FIG. 17)

The Join protocol includes the steps set forth herein. In response to receipt of the request, the association object first checks to determine if the designated relationship currently exists. If it does not exist, an exception is raised, unless no relationship was specifically identified, in which case a new relation is created in the association object at 301 of FIG. 4. Assuming that the relationship exists, the association object updates the relation to include the new joined object and invokes the Join/Leave awareness protocol detailed above to ensure that the new relation exists at all registered sites.

If the relationship already includes one or more model objects, then the message Request-DelegateJoin is sent to an arbitrarily chosen one of those model objects (the "joined" model object). The association object registers five guesses with the LocalTI, receiving five guessid's for these five assumptions including guessid1-meaning that data read from the joined model object is committed; guessid2 meaning that the data and graph written are writable at the primary copy of the joining model object; guessid3 meaning that the graph read from the joining model object is committed; guessid4 meaning that the graph read from the joined model object is committed; and, guessid 5 meaning that the data and graph written are writable at the primary copy of the joined model object. If the current value of the graph of the requesting model object is uncommitted, then guessid3 is placed on the Momentguess list 204 of the graph history of the model object. If committed, then guessid3 is confirmed at the LocalTI with a message sent containing the VT of the join operation, the current value of the graph of the model object, the virtual time $VT_g$ that the graph was modified, the requesting OID of the model object, the new pairing of the primary association object and the OID of the requesting model object, and guessids 1, 2, 4 and 5.

The arbitrarily selected model object which receives the Request-DelegateJoin message checks to see if the VT associated with the last change to the current graph is committed. If committed, it sends a ConfirmGuess message specifying the VT of the Request-DelegateJoin message, and guessid4. If not committed, it inserts guessid4 on the MomentGuess list 204 of the history write moment associated with the last change to the current graph. If the VT associated with the last change to the model data is committed, then a ConfirmGuess message is sent specifying the VT of the Request-DelegateJoin message, and guessid1. If not, guessid1 is inserted on the MomentGuess list 204 of the history write moment associated with the last change to the model data.

Next, the model object creates an augmented graph (cf: FIG. 11) formed by merging the current graph with the graph received in the Request-Delegatejoin message and augments the pairing by adding the joining OID to the relation. The augmented graph along with the data is propagated to all model objects on the augmented graph via the message DistributeGraphAndData, containing the VT, the graph and the data. The selected model object also sends Request-ConfirmUpdateGraph to the primary copy of the original graph prior to merging, specifying guessid5, VT, and the time $VT_o$ that the original graph was last written. Finally, the selected object sends a Request-ConfirmUpdateGraph message to the primary copy of the graph, the identity of which was received in the Request-DelegateJoin message specifying guessid2, and $VT_g$.

Model objects respond to the DistributeGraphAndData message from the selected model object by creating new uncommitted write moments in their data history and graph history associated with the given VT and by notifying the attached VP objects.

The concurrency control mechanism is augmented for Join situations whereby model objects at the primary site respond to the message Request-ConfirmChangeGraph, specifying a VT, a graph virtual time $VT_g$, and a guessid by performing the GL and GNC operations and the NC operations detailed below. If the checks succeeds, then a Response-ConfirmGuess is sent to the originating site corresponding to the VT, containing that guessid. If the checks do not both succeed, a Response-DenyGuess is generated to the originating site corresponding to the VT and containing that guessid.

When a transaction is committed or aborted, and the guesses on the MomentGuess list are confirmed or denied, remaining guesses may be remote guesses, associated with a RemoteTI rather than a LocalTI. When this occurs, instead of notifying the RemoteTI directly, a ConfirmGuess or DenyGuess with a specified guessid is sent to the originating site of the transaction, as determined by the VT of the RemoteTI.

Specific Leave Protocol (FIG. 18)

When a user request is received by an association object for a model object to leave a particular relationship, it first checks entry 301 to verify that the relationship exists. If it did not exist, an exception is raised. Assuming that the entry is found, the entry is updated to remove the model object which is leaving. The Join/Leave protocol detailed above is executed to verify that the update to the relationship exists at all registered sites. The message Distribute-Leave is sent to all model objects in the replica set. The Distribute-Leave message includes the VT, the relationship, the virtual time of the last write moment of the graph $VT_g$, and the model object leaving. A guessid is registered with the LocalTI and the message Request-ConfirmChangeGraph is sent to the primary copy of the replica set, along with the VT, $VT_g$, and the guessid.

If the write moment of the graph associated with the time $VT_g$ is not committed, then a second guessid is registered with the LocalTI and stored in the MomentGuess list 204 associated with that write moment. When a model object receives the message Distribute-Leave, it creates a new graph write-moment, whose value is obtained from the graph write-moment at $VT_g$ by deleting the component of the pairing of the relationship with the identity of the leaving model object. If the deletion results in a disconnected graph, all nodes which will be unreachable due to the deletion will also be deleted. It is conceivable that the write moment $VT_g$ would not yet exist at the time that the Distribute-Leave message is received, in which case the message would be queued at the model object's Leave queue as shown at 207 in FIG. 3, until the write moment is created or until the VT transaction is aborted.

Model Object Concurrency Control at Originating Site

During a transaction whose current VT is $VT_n$, the model objects perform the operations described above, but also do the following:

(a) record the graph time, $VT_g$ as the time at which the current replica set was last changed;

(b) if the write moment for $VT_g$ is uncommitted, the model object registers a guess with the LocalTI that this write moment will eventually commit, and records the guess identifier and LocalTI of this guess in the MomentGuess list 204 for that write moment;

(c) if the transaction reads the current value of the object, the model object records the time of the write moment of that value as $VT_r$; and, if the transaction writes the current value of the object without reading it, the model object records $VT_r$ as equal to $VT_n$;

(d) when the TransactionExecuted operation is received after all user operations of the transaction have completed at the initiating site, the model object does the following sub-operations:

[i] if the object was read but not written in this transaction, if the model object is the primary copy, it performs the RL and GL operations defined below; or, for non-primary copies, it registers a guess with the LocalTI and sends the message Request-ConfirmRead to the primary site including the OID of the primary copy, $VT_g$, $VT_r$, $VT_n$, and the guessid, whereby the primary site will later send a reply confirming or denying the guess;

[ii] if the object was written, if the model object is the primary copy, it sends a Distribute message to all remote sites, containing the OID of the remote copy, the changed value, and the virtual time VT; and then performs the RL, NV, and GL operations described below;

[iii] for each object written which is not primary, it registers a guess with the LocalTI, sends a Request-ConfirmWrite messages to the primary site with the OID of the primary copy, $VT_n$, $VT_g$, $VT_r$, and the guessid;

(e) each model object responds to additional messages including:

[i] a Distribute message by creating a new WriteMoment with the designated VT and then notifying all VPs;

[ii] a Request-ConfirmRead message by performing the RL and GL operations defined below, and then returning either a Response-Confirmed or Response-Denied message specifying the requesting VT and the guessid;

[iii] a Request-ConfirmWrite by performing the RL, NC, and GL operations, below, and then returning either a Response-Confirmed or Response-Denied message specifying the requesting VT and the guessid; and

[iv] in response to a Request-ConfirmChangeGraph which is sent as a result of the join or leave operations, checking of GL and GNC guesses are performed.

A LocalTI will receive Response-Confirmed or Response-Denied as a result of the above protocols, which response will include a guessid. In response to the Response-Confirmed message, the LocalTI confirms the guess, which, if it is the last guess, will cause the transaction to commit. In response to Response-Denied, the LocalTI denies the guess, which aborts the transaction.

Concurrency Control Operations at Primary Copy RL

Figures 12A, 12B:
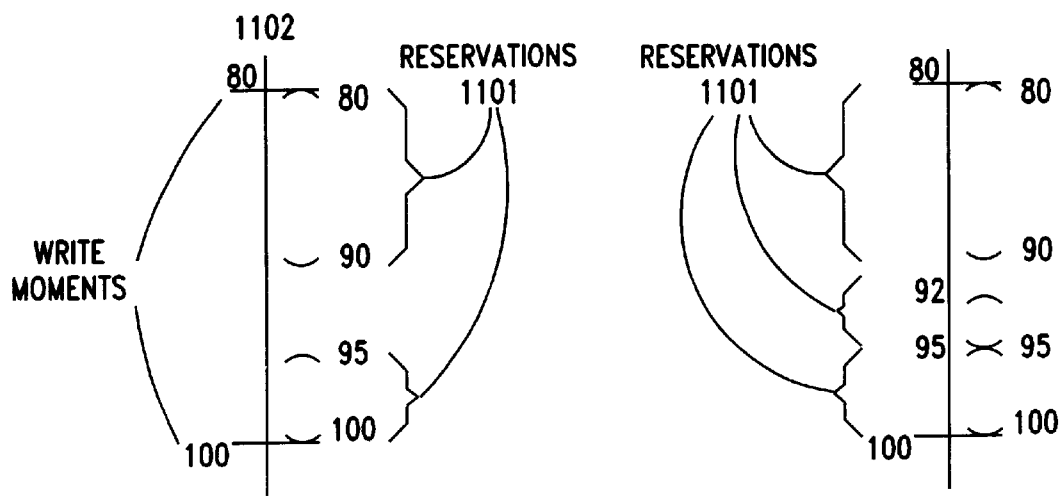
FIGS. 12A and 12B illustrate the reservation list for virtual times as used for write operations in accordance with the present invention.

In the RL operation, a check is made that no write operations occurred in the interval between $VT_r$ and $VT_n$. If no write operations occurred, the reservation list 1102 of FIG. 12 is augmented by the interval ($VT_r$, $VT_n$), and the check passes. If write operations occurred, the check fails. FIG. 12A illustrates the interval registrations 1101 shown there as [(80–90), (95–100)]and write moments [80, 100] on reservation list 1102. Assuming a Request-Confirm Write specifying $VT_n$=95 and $VT_r$=92, a check indicates that no write operations occurred in the interval between $VT_r$ and $VT_n$ (i.e., between 92 and 95). The registration list 1102 is then augmented, as indicated in FIG. 12B to include the reserved interval (92–95).

NC

In the NC operation, a check is made that no interval on the reservations list 102 includes the time $VT_n$. If not interval includes that time, the check succeeds and a write moment is created for $VT_n$.

GL

In the GL operations, a check is made that no graph updates occurred in the open interval $VT_g$ and $VT_n$. If no updates occurred, then the reservation list 1102 of the graph history is updated to include the open interval ($VT_g$, $VT_n$) and the check succeeds.

GNC

In the GNC operation, a check is made that no interval on the graph reservations list includes time $VT_n$. If no interval includes that time, the check succeeds and a write moment is created for $VT_n$.

For all of the foregoing operations, if the operation is performed locally, the transaction is immediately aborted if a check fails, no guesses are generated if all checks succeed. If the operations are performed remotely, in response to a Request, then a Response-Confirm is issued if all checks succeed and a Response-Deny if any check fails. There message contain the VT and guessid copied from the Request. The confirmation message from a primary site (Confirm or Deny) is only sent to the originating site, which will wait for all confirmations to arrive and then forward a summary Commit or Abort of the transaction to all other sites.

SECTION VI
Method of Operation for View Notifications

In an AttachView user request, a "view type" parameter is specified which will be either optimistic or pessimistic, referring to whether the user wishes continuous consistency (pessimism) or intermittent consistency with immediate responsiveness (optimism). During the implementation of an AttachView request, when it is determined that a VP object does not exist and that a new VP is to be created, an optimistic VP class object is created if the parameter specifies optimistic or a pessimistic VP class object is created in accordance with specification of a pessimistic parameter.

Figure 9:
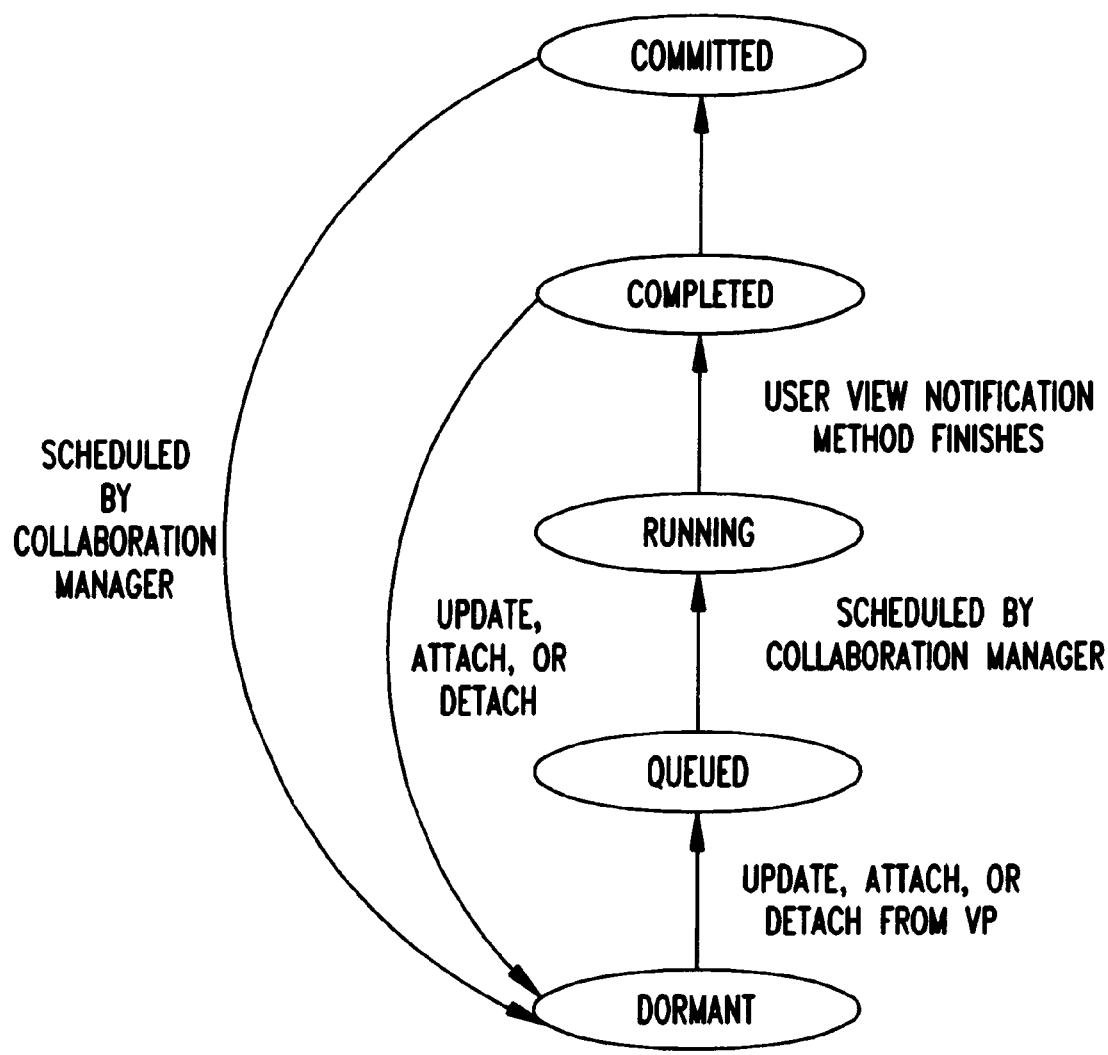
FIG. 9 diagrammatically illustrates state transitions for an optimistic ViewTI.
Figure 10:
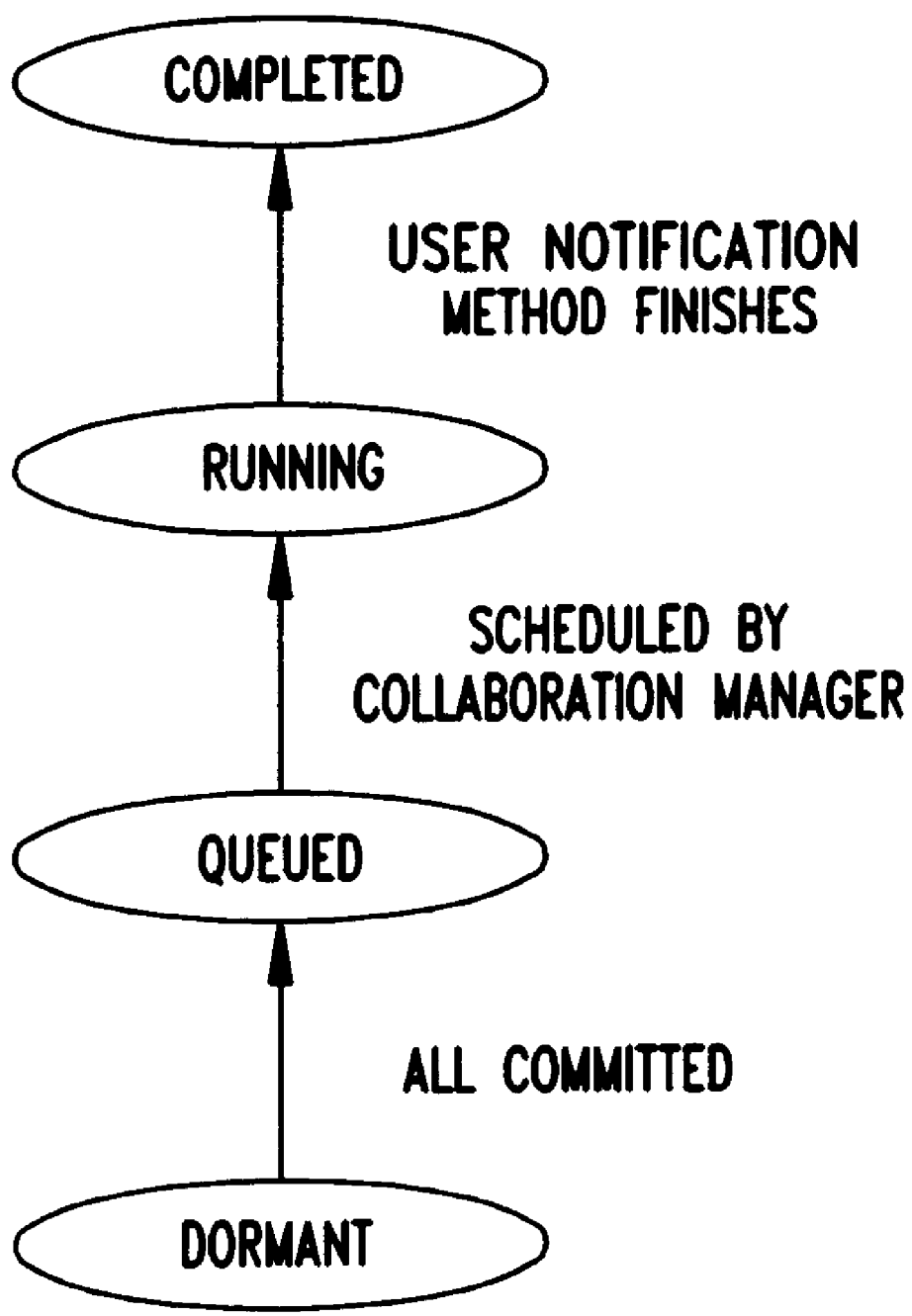
FIG. 10 diagrammatically illustrates state transitions for a pessimistic ViewTI.

The ViewTI is specialized in that its state 407 can take on any of the values selected from Dormant, Queued, Running, Completed, or Committed, although the Committed state will not apply to pessimistic VPs. The state transitions are illustrated in FIGS. 9 and 10. In addition, the ViewTI includes a reference 702 of FIG. 7, to a user view object at the application level, a table ModelState 701 with one entry 702 per attached model object 702a. Each entry in the table includes the change information, at 702b, indicating that the model object has changed since the last time that the user view was scheduled. For scalar objects, the change information takes the value attached, detached, updated or unchanged; whereas for aggregate model objects, the updated value is augmented by a list 702c of aggregate components which have been deleted, inserted or modified. The ViewTI additionally maintains the WriteTime as the VT of the latest write moment of the last object, and the state at 702e as to whether the write moment committed at the write time.

Figure 7:
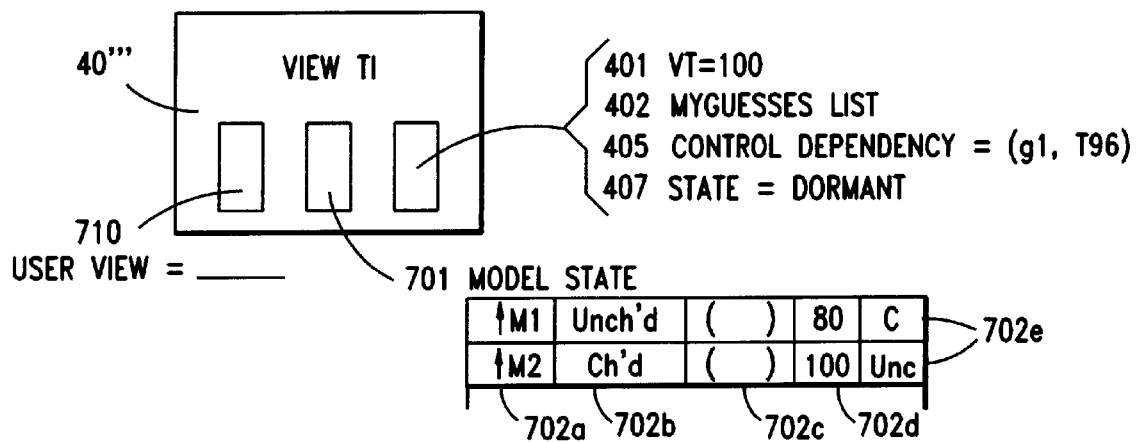
FIG. 7 provides a schematic representation of a ViewTI object and the information maintained therein.

The optimistic VP object maintains the state and behavior of VP objects as detailed with reference to FIG. 7. The pessimistic VP object maintains the state and behavior of the VP objects of FIG. 7 and additionally includes a table of WaitingViews 609, each entry of which consists of a reference to a ViewTI object.

Optimistic VP Object Implementation

When a new VP is created, the current ViewTI 603 is initially set to a reference to a new ViewTI object whose VT 401 is zero, whose state is Dormant, whose ModelState table 701 is empty and whose ControlDependency table 405 is empty. Various optimistic responses are hereinafter detailed with specific reference to the Figures, particularly FIG. 7.

Optimistic Attachview

When the VP receives an AttachView as a result of an attach by a model object attached to the VP, the VP: invokes a SeizeView operation on itself, and creates a new model state table entry 702a referring to the model object within the current ViewTI, referenced from 603, having the change value of "attached" at 702b; the write time 702d set to the VT of the last write moment before the attach VT, as determined from the history 202 of the model object; and, state set to "committed" at 702e, paralleling the state of the last write moment determined from the history of the model object being attached. After all of the foregoing, a ScheduleView operation is invoked on the VP object.

Optimistic Notifyupdate

When the VP receives a NotifyUpdate method call, specifying a particular VT, it refers to the ModelState table 701 of the current ViewTI for the entry 702a, corresponding to the model object being updated. Provided that the VT within the NotifyUpdate method call is later than the WriteTime of the entry, the VP does the following: (a) invokes a SeizeView operation on itself; (b) sets "changed=updated" in the selected entry 702b of the ModelState table; (c) for an aggregate model object, sets any additional information about the change, as provided from the model object history, for the difference between the values at this VT and the value at the previous WriteTime; (d) sets Writetime 702d to the VT of the update; (e) sets state to the "committed" state of this write moment; (f) sets the VT of the current ViewTI to the maximum of its current value 401 or the VT of the NotifyUpdate; and (g) invokes a ScheduleView operation on the VP object.

Optinistic Detachview

When a DetachView is received at the VP, it locates the entry 702 corresponding to the model object being detached in the ModelState table 701. Upon location of the entry, the VP performs the following steps: (a) invokes a SeizeView operation on itself; (b) sets "changed" to "detached" in the selected entry 702b; and (c) invokes a ScheduleView operation in the VP object.

Optimistic Seizeview

The VP receives a SeizeView "request" from itself, as mentioned in the preceding descriptions. In response, it examines the state 407 of the current ViewTI as determined by reference to 603. If it is "running", then the VP waits until the state has been changed to "completed." If the state is "completed" or "committed," the VP does the following: (a) creates a new ViewTI; (b) makes the new ViewTI the current ViewTI in reference 603 of the VP; (c) initializes the new ViewTI to state "dormant" at 407; (d) sets the previous current ViewTI to "dormant" in its state 407, to prevent a commit notification from being sent for it; and, (e) copies the previous ViewTI ModelState table 701 to the new ViewTI ModelState table, excluding detached entries, and making the state of each entry "unchanged".

Optimistic Scheduleview

When the VP invokes a ScheduleView operation upon itself as a result of the above actions, it performs the following actions: if the state of the current ViewTI is "dormant," it is placed on the queue 105 of the Collaboration Manager and the state 407 becomes "queued". If other than "dormant", no action is taken.

Optimistic Commit

When the VP receives notification of a commit for an attached model object at a specific VT, it examines the current ViewTI reference at 603. If the ModelState entry in table 701 has a WriteTime which is equal to VT, its state becomes "committed". If the guess list 402 is empty and all changed model objects are committed, with the ViewTI in the completed state, then the ViewTI is placed in the committed state and is queued for execution in queue 105. The guesses on the ControlDependency list 405 are then confirmed.

Optimistic Abort

When the ViewTI receives notification of an Abort for one of its attached model objects, the ViewTI takes the same action as if this were an update of the designated model object with the new value being the one now having the latest VT (excluding the aborted time) in the model object's history. It additionally denies all guesses on its ControlDependency list 405.

Execution of Oueued Viewti (FIGS. 9 and 10)

When the Collaboration Manager schedules a ViewTI for execution and the ViewTI state 407 is queued, the following sequence occurs: (a) the ViewTI enters the "running" state; (b) the ViewTI is removed from the queue; (c) the Collaboration Manager's context 101 becomes "view context" with a context object 109 referring to the ViewTI; (d) the user view object's notification method is invoked, passing as parameters the set of attached, updated, and detached model object references from the ModelState table 701, whereby the user's view object will be able to read any of the attached model objects to get the value as of the VT in the ViewTI; (e) the ViewTI enters the "completed" state, registered at 407; (f) the ViewTI invokes the concurrency control protocol as if it were a transaction which reads the values of all model objects whose WriteTimes were less than the VT of the ViewTI; and (g) if the foregoing results in an empty guess list 402, and the ModelState table 701 indicates that all changed objects are in the committed state, then the ViewTI enters the "committed" state, shown in 407, and invokes the commit notification method of the user view. Otherwise, the ViewTI remains in the "completed" state. If the guess list 402 becomes empty at a later time, with all changed model objects committed, and the ViewTI has not been put in a dormant state, the commit notification method of the user view will be invoked at that time.

Execution of Committed ViewTI

When the Collaboration Manager schedules a ViewTI for execution, and the ViewTI is in the "committed" state, the following steps ensue: (a) the Collaboration Manager's context 101 becomes "view context"; (b) the commit notification method of the user view is invoked; and (c) the state 407 of the ViewTI becomes "dormant".

For each concurrency control guess that is confirmed by a model object on behalf of a read request at a particular virtual time VT, the model object notifies the ViewTI corresponding to the virtual time VT, which then confirms the guess. If the guess list 402 becomes empty with all changed model objects "committed", then the guesses on the ControlDependency list 405 are confirmed. Additionally, if the ViewTI is in the "running" state, the ViewTI waits until it is in the "completed" state, changes the state to "committed" and schedules itself on queue 105. If the ViewTI is in the "completed" state, it immediately enters the "committed" state and schedules itself for execution in the queue 105. If the ViewTI is "dormant", then nothing is done, since it is apparent that a superseding view notification has already been scheduled.

For each concurrency control guess that is denied by a model object on behalf of a read request at a particular VT, the model object notifies the ViewTI corresponding to that VT, which then denies the guesses on the ControlDependency list 405.

Pessimistic VP Object Implementation

The pessimistic VP object is initialized with an empty WaitingViews table 609 of FIG. 8. When the VP object receives an update notification for an attached model object at a virtual time VT, it locates the unique ViewTI WaitingViews table 609 with this VT. If none exists, a ViewTI is created with this VT, in "dormant" state, and a modelstate table 701 having an entry for each attached model object, unchanged, and uncommitted. This ViewTi is indexed into the table 609. The VP then examines the ModelState table 701 in the ViewTI that is either just located or just created. It changes the entry at 702a corresponding to the updated model object so that the entry at 702b should now indicate "changed". Next the VP invokes the concurrency control mechanism such as the one detailed above to determine for each unchanged object whether a read will succeed at a given VT for the value written at eh previous write moment. This will generate a set of guesses in the list 402 of the ViewTI. If all guesses are confirmed, and all ViewTIs for earlier VTs have been scheduled, the ViewTI will be scheduled. It is possible that the update notification just received is for a model object which has been though to be unchanged, and for which a guess had bee generated. That guess will be denied, but the denial will be ignored since only guesses about unchanged objects must be confirmed.

If there are ViewTIs in the Waiting Views table with later VTs, revised guesses may need to be constructed. In particular, if for some ViewTI with $VT_n$>VT, with the model object unchanged and the previous write moment to $VT_n$ was some value less than VT, the concurrency control mechanism will now be asked to confirm a read request with a previous write moment equal to VT.

Attach or Detach

If the VP receives a notification that a model object has been attached or detached, the request is treated identically to an update request, except that the designated model object is labelled "attached" or "detached" rather than "changed."

Commit

If the VP receives a notification that a model object has committed for a particular Vt, it locates the ViewTI in the WaitingViews table 609 whose Vt matches the given VT. Within that ViewTI, it locates the entry in the ModelState table 701 which corresponds to the committed model object and changes its state 702e to "committed." It then invokes the TestSchedulable operation, detailed below, on the designated ViewTi to see whether the ViewTI is now schedulable.

Abort

If the VP receives notification that a model object has aborted at a particular time VT, it locates the ViewTI for that VT in the Waitingviews table 609. If that entry is found, it is deleted. Any ViewTIs which read an unchanged value from the write moment at that VT must now be revised to reflect the abort status. For each such ViewTI, a new concurrency control request is issued to verify a read with the VT of the ViewTI and a WriteTime of the previous write moment, not including the time of the aborted transaction.

For each concurrency control guess that is confirmed by a model object on behalf of a read request at a particular virtual time CT, the model object notifies the ViewTI corresponding to that VT, which then locates the ModelState table 701 entry corresponding to that model object and marks the state "committed." It then invokes the TestSchedulable operation on the ViewTI to see whether this change allows the ViewTI to be scheduled.

Testschedulable

The TestSchedulable operation for a ViewTI associated with a pessimistic VP is to be described below. A check is made that the ViewTI meets all the following conditions: (a) it is the oldest Dormant ViewTI on the VPs WaitingViews list 609; and, (b) all changed and unchanged model objects in the ModelState table 701 are committed. When this happens, the change information about the changed objects is computed by interrogating each changed model object which is an aggregate for the difference between its state at the ViewTIs VT and the state at the previous VT, with the information saved at 702c. The ViewTI's state becomes "queued" and the Collaboration Manager is requested to schedule it on its queue 105.

When the Collaboration Manager schedules a ViewTi for execution and the ViewTI is in the Waiting state, the following sequence of events occurs: (a) enters the "running" state; (b) the ViewTI is dequeued from the queue 105; (c) the Collaboration Manager's context is changed to "view context" with a context object referring to the ViewTi; (d) the user view object's update notification procedure is invoked, passing as parameters the set of attached, updated, and detached model objects, and giving the value as of the Vt of the ViewTi; (e) the ViewTI enters the "completed" state, as recorded at 407; (f) the guesses on the ControlDependency list 405 of the ViewTI are confirmed; and (g) the VP's WaitingViews list 609 is checked to determine if there is a subsequent ViewTI, and the TestSchedulable process invoked on the next subsequent ViewTI.

The invention, as it has been described with reference to several specific embodiments, provides the user with a collaboration system in which changes are propagated automatically and consistently. One having skill in the relevant art will recognize that modifications, such as variations in the ordering of certain operations, consolidation of functions, and bundling of messages to common site destinations, may be made without departing from the spirit and scope of the invention as set forth in the appended claims.

Having thus described our invention, what we claim as new and desire to secure by Letters Patent is:

1. A collaboration of distributed user sites having shared computer information comprising:

a local user site having a collaboration manager for creating at least one model object, for interacting with collaboration managers at other of said distributed user sites and for executing transactions for reading and writing said at least one local model object created by said collaboration manager for responding to requests pertaining to said shared computer information, interface means for reading and writing said at least one local model object and at least one programming interface for attaching programmer-specified pessimistic and optimistic view object to said at least one local model object; and a plurality of remote user sites each having at least one remote model object and having at least one of an optimistic and pessimistic view object attached to said remote model object, wherein said at least one local model object and said at least one remote model object maintain said shared computer information.

2. The collaboration of claim 1 wherein one of said local user and said plurality of remote user sites has an original version of said share computer information and the remaining user sites maintain replicated versions of said shared computer information.

3. The collaboration of claim 2 wherein one of said local user and said plurality of remote user sites is the primary site for controlling updates to said shared computer information.

4. The collaboration of claim 1 wherein said plurality of remote user sites comprises a plurality of remote user sites each having a dedicated collaboration manager for creating objects and executing transactions among objects, at least one remote model object created by said dedicated collaboration manager for responding to requests pertaining to said shared computer information, and interface means for reading and writing said at least one remote model object at said remote user site.

* * * * *